United States Patent [19]
Hiraki et al.

[11] Patent Number: 5,777,999
[45] Date of Patent: Jul. 7, 1998

[54] CODED SIGNAL DECODING CIRCUIT, AND SYNCHRONOUS CONTROL METHOD FOR THE SAME, SYNCHRONOUS DETECTING METHOD, AND SYNCHRONIZATION DETECTING CIRCUIT THEREFOR

[75] Inventors: Toshiyuki Hiraki; Akira Yamada; Masashi Oki, all of Tokyo, Japan

[73] Assignee: Mitsubishi Denki Kabushiki Kaisha, Tokyo, Japan

[21] Appl. No.: 863,296

[22] Filed: May 27, 1997

Related U.S. Application Data

[63] Continuation of Ser. No. 662,937, Jun. 12, 1996, abandoned.

[30] Foreign Application Priority Data

Jan. 26, 1996 [JP] Japan .................................. 8-012315

[51] Int. Cl.[6] ...................................................... H04L 7/08
[52] U.S. Cl. .......................................................... 370/509
[58] Field of Search ...................................... 370/503, 507, 370/509, 512, 513, 510, 514; 371/37.01; 375/365, 366, 368; 348/423, 430, 434; 704/201, 227

[56] References Cited

U.S. PATENT DOCUMENTS

| | | |
|---|---|---|
| 5,301,196 | 4/1994 | Hasegawa .............................. 370/510 |
| 5,495,552 | 2/1996 | Sugiyama et al. . | |
| 5,608,734 | 3/1997 | Sandler et al. ........................ 370/509 |

FOREIGN PATENT DOCUMENTS

| | | |
|---|---|---|
| 1-501435 | 5/1989 | Japan . |
| 6-103897 | 5/1994 | Japan . |

OTHER PUBLICATIONS

Information technology—Coding of moving pictures and associated audio for digital storage media at up to about 1.5 Mbit/s–Part 3: Audio, International Standard ISO/IEC 11172-3:1993, Technical Corrigendum 1, Published 1996-04-15.

*Primary Examiner*—Chau Nguyen
*Attorney, Agent, or Firm*—Burns, Doane, Swecker & Mathis, LLP

[57] ABSTRACT

When a signal indicating a transition state from a synchronized state to an asynchronous state is outputted from a synchronous state register 8, data "0" generated by a "0" generating circuit 20 are stored in a data memory 10 instead of an output of an audio signal generating circuit 6, thus initializing the data memory 10 in advance. In a conventional coded-signal decoding circuit, when a transition was made from a synchronized state to an asynchronous state after failing to establish synchronization, the data memory 10 had to be initialized at a point in time before starting the next synchronous detection, presenting a problem in terms of time. To achieve this, a synchronous control method, a synchronous detecting circuit, and a synchronous detection method are provided.

6 Claims, 8 Drawing Sheets

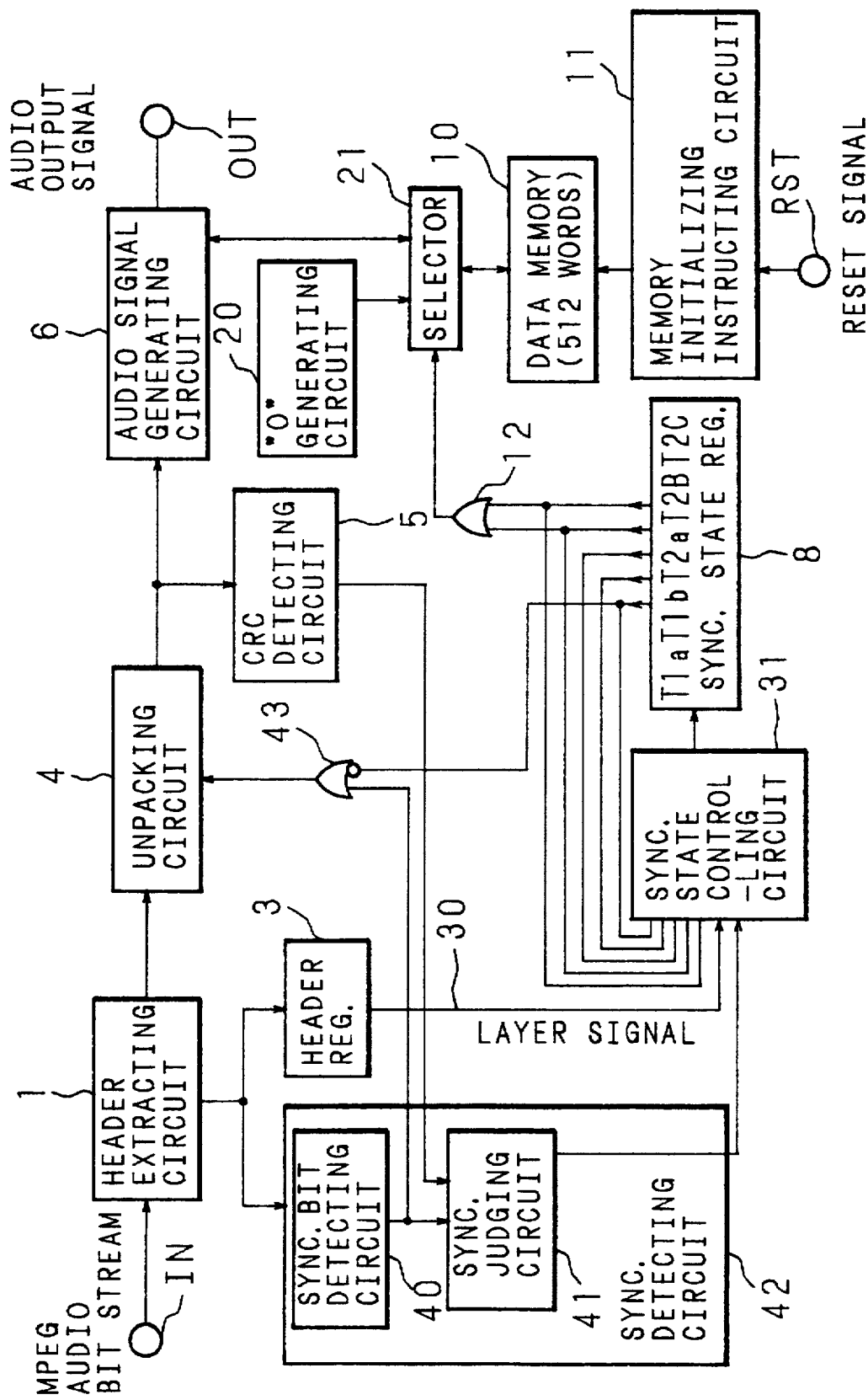

CODED SIGNAL DECODING CIRCUIT, AND SYNCHRONOUS CONTROL METHOD FOR THE SAME, SYNCHRONOUS DETECTING METHOD, AND SYNCHRONIZATION DETECTING CIRCUIT THEREFOR

This application is a continuation, of application Ser. No. 08/662,937, filed Jun. 12, 1996, abandoned.

BACKGROUND OF THE INVENTION

1. Field of the Invention

The present invention relates to a coded-signal decoding circuit for inputting a coded (encoded) digital signal, or more specifically, a bit stream consisting of successive frames containing synchronous information, header information, and compressed sample data, and for decoding the digital signal for output. The invention also relates to a synchronous control method for controlling the synchronous state for the same, a synchronous detection circuit, and a synchronous detection method.

2. Description of the Related Art

As an example of a prior art for decoding a coded digital signal for reproducing, an MPEG (Moving Picture Experts Group) audio decoding circuit will be described below. FIG. 1 is a schematic diagram showing a coded frame structure according to an MPEG audio signal coding method. For details of MPEG audio, refer to ISO/IEC/JTC1/SC2 "Information Technology-Coding of Moving Pictures and Associated Audio for Digital Storage Media up to about 1.5 Mbit/s. Part 3: Coding of Audio Information".

Serial transmission data (bit stream) coded by the MPEG audio signal coding method are packed into frames each consisting of a header information field 51, a CRC (Cyclic Redundancy Check Code) check bit field 52 (an optional field), an audio data field 53. As shown in an enlarged part in FIG. 1, the header information field 51 contains a 12-bit synchronous field 61 of all "1" ("111111111111") for coded-frame detection, and a field 62 consisting of layer information and other information indicating the bit rate, the sampling frequency, the presence or absence of CRC check bits, etc.

The CRC check bit field 52, which follows the header information field 51, is provided to check the audio data field 53 for errors; as noted above, this field is optional. The audio data field 53 carries audio data encoded by dividing the input digital audio signal into subbands on a frame-by-frame basis, each frame containing a predetermined number of samples. In this MPEG audio signal coding method, the audio signal is divided into 32 subbands, to each of which the so-called perceptual coding utilizing the acoustic properties of the human ear is applied.

The MPEG audio coding standard defines three modes of coding, Layer I, Layer II, and Layer III. A higher layer achieves higher quality and higher data compression, but instead increases hardware quantity. A detailed description will not be given here, but briefly, the number of samples contained in the audio data field 53 in one frame is 384 in Layer I, and 1152 samples in Layer II and Layer III.

To receive coded bit stream and reproduce a medium storing the coded bit stream, a decoding circuit for decoding the coded audio signal for reproducing is necessary. A description will now be given of an MPEG audio decoding circuit.

FIG. 2 is a block diagram showing a configuration example of an MPEG audio decoding circuit according to the prior art. The description hereinafter given assumes that the bit stream to be processed contains a CRC check bit field 52.

In FIG. 2, reference symbol IN denotes an input terminal for an MPEG audio bit stream, and OUT denotes an output terminal for an audio output signal. Radio waves of satellite broadcasts, recording media such as digital disks, etc. can be considered as the source of the NIPEG audio bit stream inputted at the input terminal IN. The audio signal outputted at the output terminal OUT is a digital audio signal, which may be outputted as an analog signal after D/A conversion or may be outputted directly in digital form for recording on another recording medium.

Reference numeral 1 denotes a header extracting circuit which extracts the header information field 51 from the MPEG audio bit stream inputted via the input terminal IN. The header information field 51 extracted by the header extracting circuit 1 is supplied to a synchronous detecting circuit 2 and a header register 3. The CRC check bit field 52 and audio data field 53 in the inputted bit stream are passed through the header extracting circuit 1 and inputted directly into an unpacking circuit 4.

The synchronous detecting circuit 2 detects the synchronous bit field 61 from the header information field 51 extracted by the header extracting circuit 1, and judges the synchronization. The synchronous judgment result of the by the synchronous detecting circuit 2, that is, information indicating whether or not the 12 successive bits are all "1", is supplied to a synchronous state controlling circuit 7. On the other hand, the header register 3 holds the contents of the field 62, which is the field remaining after removing the synchronous bit field 61 from the header information field 51 extracted by the header extracting circuit 1.

The unpacking circuit 4 unpacks (decomposes) the bit stream outputted from the header extracting circuit 1 into the CRC check bit field 52 and audio data field 53 in accordance with an instruction from an unpacking instruction circuit 9 (to be described later). The data unpacked by the unpacking circuit 4 is supplied to a CRC detecting circuit 5 and an audio signal generating circuit 6.

The CRC detecting circuit 5 takes in the CRC check bit field 52 from the data outputted from the unpacking circuit 4, and checks errors.

The audio signal generating circuit 6 serves multiple functions, that is, to transfer data between the unpacking circuit 4, a data memory 10, and a selector 14, and to decode the coded audio data. More specifically, the audio signal generating circuit 6 performs the following three functions: the first function is to temporarily store the coded audio data unpacked by the unpacking circuit 4 into the data memory 10; the second function is to read out and decode the coded audio data stored in the data memory 10 and to store back the decoded audio signal again into the data memory 10; and the third function is to read out the decoded audio signal stored in the data memory 10 and output it to the output terminal OUT.

In this way, the data memory 10 not only stores temporarily the coded audio data unpacked by the unpacking circuit 4 and transferred via the audio signal generating circuit 6, but also stores the audio signal decoded from that data by the audio signal generating circuit 6. Such data transfer between the audio signal generating circuit 6 and the data memory 10 is performed to adjust the final output timing of the audio signal.

A mute circuit 13 generates mute data to be outputted as an audio signal from the output terminal OUT at muting, and supplies it to the selector 14a.

The selector 14a selects either the audio signal decoded by the audio signal generating circuit 6 and stored in the data memory 10 or the mute data generated by the mute circuit 13, for outputting the output terminal OUT. When the selector 14a selects the mute circuit 13, the mute data is outputted from the mute circuit 13 to the output terminal OUT, and when the selector 14a selects the audio signal generating circuit 6, the audio signal is read out from the data memory 10 to the output terminal OUT via the audio signal generating circuit 6. The selection of the selector 14a is controlled by an output signal from a mute instructing circuit 12 to be described later.

Based on the synchronous judgment result of the by the synchronous detecting circuit 2 and a synchronous state currently held in the synchronous state register 8 hereinafter described, the synchronous state controlling circuit 7 generates one of five states (two unlocked states and three locked states which will be described later) as the next synchronous state. Details of the transition between states will be described later. The synchronous state generated by the synchronous state controlling circuit 7 is supplied to the synchronous state register 8.

The synchronous state register 8 holds the synchronous state generated by the synchronous state controlling circuit 7; the synchronous state thus held is not only supplied to the unpacking instructing circuit 9 and mute instructing circuit 12, but fed back to the synchronous state controlling circuit 7. More specifically, the synchronous state register 8 comprises signal output terminals T1a, T1b, T2a, T2b, and T2c, respectively corresponding to the five states; of these output terminals T1a, T1b, T2a, T2b, and T2c, one output terminal corresponding the synchronous state given from the synchronous state controlling circuit 7 outputs a signal "1", and the other output terminals each output a signal "0".

The unpacking instructing circuit 9 issues an unpacking instruction to the unpacking circuit 4 when the contents of the synchronous state register 8 show a locked state under which a synchronized condition is established. More specifically, the unpacking instructing circuit 9 is constructed from a three-input OR gate, and output signals from the output terminals T2a, T2b, and T2c, one of which outputs signal "1" when an unlocked state is detected, of the synchronous state register 8 is supplied. In this arrangement, when the signal "1" is outputted from one of the output terminals T2a, T2b, and T2c, the unpacking instructing circuit 9 supplies the signal "1" to the unpacking circuit 4, instructing it to unpack.

When the unpacking instruction is given from the unpacking instructing circuit 9, the unpacking circuit 4 unpacks (decomposes) the bit stream, which is outputted from the header extracting circuit 1, into the CRC check bit field 52 and audio data field 53, as previously described.

A memory initialization instructing circuit 11 initializes the data memory 10 when the contents of the synchronous state register 8 show a specific state indicating an asynchronous condition. More specifically, the memory initialization instructing circuit 11 is supplied with an output signal from the output terminal T1a of the synchronous state register 8, from which terminal a signal "1" is outputted when an unlocked state is detected. In this arrangement, when the signal "1" is outputted from the output terminal T1a, the memory initialization instructing circuit 11 supplies an initializing signal to the data memory 10, thereby initializing the data memory 10.

The mute instructing circuit 12 outputs a mute instructing signal when the contents of the synchronous state register 8 show a specific state indicating a synchronized condition. More specifically, the mute instructing circuit 12 is constructed from a two-input OR gate, and output signals from the output terminals T2b and T2c, one of which outputs signal "1" when an unlocked state is detected, of the synchronous state register 8 is supplied. In this arrangement, when the signal "1" is outputted from one or the other of the output terminals T2b and T2c, the mute instructing circuit 12 outputs the signal "1". The signal "1" outputted from the mute instructing circuit 12 is supplied to the selector 14a as the mute instructing signal used to control its selection operation.

Next, the basic operation of the conventional MPEG audio decoding circuit having the above-described configuration will be described. When the MPEG audio bit stream is inputted to the input terminal IN, the header extracting circuit 1 extracts the header information field 51, and the synchronous detecting circuit 2 detects the synchronous bit field 61. As the result, when the detection shows correct synchronous, the field 62, the remaining field after removal of the synchronous bit field 61, is extracted from the header information field 51; that is, various pieces of information necessary for decoding, such as the layer, the presence or absence of CRC, the bit rate, the sampling frequency, the channel mode, etc. are extracted and written to the header register 3.

Based on the synchronous detection result by the synchronous detecting circuit 2 and the synchronous state currently held in the synchronous state register 8, the synchronous state controlling circuit 7 generates the next synchronous state and makes the synchronous state register 8 hold it.

When the contents of the synchronous state register 8 show a locked state indicating a synchronized condition, the unpacking instructing circuit 9 outputs an unpacking instructing signal, in response to which the unpacking circuit 4 unpacks the inputted bit stream. When the optional CRC check bits are contained in the inputted frame, a CRC check circuit 3 performs an error check, and the coded audio data is then decoded by the audio signal generating circuit 6 and outputted as an audio signal from the output terminal OUT.

The synchronous detection method and the transition between synchronous states will now be described with reference to the state transition diagram shown in FIG. 3. In this conventional example, it is assumed that there are five states, that is, two unlocked states, the first unlocked state 1a and the second unlocked state 1b, and three locked states, the first locked state 2a, the second locked state 2b, and the third locked state 2c.

The first unlocked state 1a indicates the initial state, the state in which synchronization is not detected in the initial state, and the state in which synchronization is not detected in the third locked state 2c, that is, an unlocked state indicating an asynchronous condition. In this state, the signal "1" is outputted only from the output terminal T1a of the synchronous state register 8, and the signal "0" is outputted from each of the other output terminals T1b, T2a, T2b, and T2c. Accordingly, the signal "1" is supplied to the memory initialization instructing circuit 11, so that the data memory 10 is initialized. In the first unlocked state 1a, output signals of the unpacking instructing circuit 9 and the mute instructing circuit 12 both become "0", so that neither the unpacking instruction nor the mute instruction is issued. Next to the first unlocked state 1a, when synchronization is not detected, the same state is kept, but when synchronization is detected, a transition is made to the second unlocked state 1b.

The second unlocked state is to an unlocked state in which the synchronous state of the preceding frame is the first unlocked state 1a and in which synchronization is detected in the current synchronous detection operation but the coded audio data is not decoded yet. In this state, the signal "1" is outputted only from the output terminal T1b of the synchronous state register 8, and the signal "0" is outputted from each of the other output terminals T1a, T2a, T2b, and T2c. Accordingly, the signal "0" is supplied to the memory initialization instructing circuit 11, so that the data memory 10 is not initialized. In the second unlocked state 1b, output signals of the unpacking instructing circuit 9 and the mute instructing circuit 12 both become "0", so that neither the unpacking instruction nor the mute instruction is issued. Next to the second unlocked state 1b, when synchronization is not detected, a transition is made back to the first unlocked state 1a, but when synchronization is detected, a transition is made to the first locked state 2a.

The first locked state 2a is a locked state in which the synchronous state of the preceding frame is either one of the first to third locked states 2a, 2b, and 2c, or the second unlocked state 1b, and in which synchronization is detected in the current synchronous detection operation. In this state, the signal "1" is outputted only from the output terminal T2a of the synchronous state register 8, and the signal "0" is outputted from each of the other output terminals T1a, T1b, T2b, and T2c. Accordingly, the signal "0" is supplied to the memory initialization instructing circuit 11, so that the data memory 10 is not initialized. In the first locked state 2a, since the output signal of the unpacking instruction,g circuit 9 becomes "1", the unpacking circuit 4 unpacks the inputted frame; on the other hand, the output signal of the mute instructing circuit 12 becomes "0", so that the mute instruction is not issued. Next to the first locked state 2a, when synchronization is not detected, a transition is made to the second locked state 2b, but when synchronization is detected, the same state is retained.

The second locked state 2b is a locked state in which the synchronous state of the preceding frame is the first locked state 2a and in which synchronization is not detected in the current synchronous detection operation. In this state, the signal "1" is outputted only from the output terminal T2b of the synchronous state register 8, and the signal "0" is outputted from each of the other output terminals T1a, T1b, T2a, and T2c. Accordingly, the signal "0" is supplied to the memory initialization instructing circuit 11, so that the data memory 10 is not initialized. In the second locked state 2b, since the output signal of the unpacking instructing circuit 9 becomes "1", the unpacking circuit 4 unpacks the inputted frame; the output signal of the mute instructing circuit 12 also becomes "1", so that the selector 14a selects the mute data from the mute circuit 13. Next to the second locked state 2b, when synchronization is not detected, a transition is made to the third locked state 2c, but when synchronization is detected, a transition is made back to the first locked state 2a.

The third locked state 2c is a locked state in which the synchronous state of the preceding frame is the second locked state 2b and in which synchronization is not detected in the current synchronous detection operation. In this state, the signal "1" is outputted only from the output terminal T2c of the synchronous state register 8, and the signal "0" is outputted from each of the other output terminals T1a, T1b, T2a, and T2b. Accordingly, the signal "0" is supplied to the memory initialization instructing circuit 11, so that the data memory 10 is not initialized. In the third locked state 2c, since the output signal of the unpacking instructing circuit 9 becomes "1", the unpacking circuit 4 unpacks the inputted frame; the output signal of the mute instructing circuit 12 also becomes "1", so that the selector 14a selects the mute data from the mute circuit 13. Next to the third locked state 2c, when synchronization is not detected, a transition is made to the first unlocked state 1a, but when synchronization is detected, a transition is made to the first locked state 2a.

In this way, when synchronization has been detected two consecutive times, starting from the first unlocked state 1a which is the initial state, the state will have transudate through the second unlocked state 1b to the first locked state 2a, thus entering a locked state. As long as synchronization continues to be detected in the first locked state 2a, the locked state (the first locked state 2a) is kept. Conversely, when synchronization has not been detected three consecutive times, starting from the first locked state 2a, the state will have transited to the first unlocked state 1a through the second locked state 2b and the third locked state 2c, thus entering an unlocked state (the first unlocked state 1a). However, even when synchronization is not detected from the first locked state 2a, when synchronization is detected in the second locked state 2b or the third locked state 2c, it returns to a locked state (the first locked state 2a).

Next, the operation of the conventional MPEG audio decoding circuit involving state transitions will be described with reference to the schematic diagram of FIG. 4 which shows an example of the inputted bit stream. In the example shown in FIG. 4, it is assumed that the synchronous bit field 61 in each of the first to "n−1"th frames carries the correct bit pattern "111111111111", while the synchronous bit field 61 in each of subsequent frames carries an incorrect bit pattern because of an error caused, for example, by noise. More specifically, the synchronous bit field 61 in the "n"th frame shows "111111011111", the synchronous bit field 61 in the "n+1"th frame shows "111111111110", and the synchronous bit field 61 in the "n+2"th frame shows "11111111 . . . ".

In this conventional UNPEG audio decoding circuit, when synchronization has been detected two consecutive times from the first unlocked state 1a which is the initial state, in other words, when the synchronous bit field 61 in each of two consecutive frames contains a bit pattern of all "1", then it is determined that synchronization has been achieved (locked), and a decoding process is performed.

When power is turned on to the apparatus containing the above circuit, the synchronous state becomes in the first unlocked state 1a, that is, the initial state. In this state, the synchronous state register 8 outputs the signal "1" only from the output terminal T1a. This signal is supplied as the memory initializing signal to the memory initialization instructing circuit 11, which therefore directs the initialization of the data memory 10, and the data memory 10 is initialized. Since the signal "1" is not given to the unpacking instructing circuit 9 nor to the mute instructing circuit 12, neither the unpacking operation nor the mute operation is performed. During the initialization of the data memory 10, the synchronous detection operation in the synchronous detecting circuit 2 is interrupted, and will be started after initiated until the initialization of the data memory 10 is completed.

Then, when the bit stream shown in FIG. 4 is inputted under the first unlocked state 1a, the synchronous detecting circuit 2 detects that the 12 bits carried in the synchronous bit field 61 in the first frame are all "1", that is, the correct synchronization is achieved. At this point in time, the synchronous state register 8 is holding the first unlocked state 1a (outputting the signal "1" only from the output terminal T1a), so that the synchronous state controlling circuit 7 outputs to the synchronous state register 8 a signal indicating that the next state is the second unlocked state 1b. As a result, the synchronous state transits to the second unlocked state 1b, and the synchronous state register 8 outputs the signal "1" only from the output terminal T1b. In the meantime, the header information in the field 62, other than the synchronous bits, are written to the header register 3.

In practice, the synchronous detection by the synchronous detecting circuit 2 is performed as follows: in the first unlocked state 1a under which no synchronization is achieved, the inputted bit stream is checked by shifting bit by bit, and when a bit sequence "111111111111" is detected, in other words, when a succession of twelve times of "1" is inputted, it is determined that synchronization has been detected. Once synchronization has been detected, the synchronous detecting circuit 2 thereafter calculates the frame length of that frame from the header information following the bit stream "111111111111", and thereby determines the synchronous bit position in the next frame and judges whether or not the synchronous bits "111111111111" are located there.

Once the second unlocked state 1b is established in this 5 way, the synchronous state register 8 outputs the signal "1" only from the output terminal T1b; therefore, the memory initialization instructing circuit 11 does not initialize the data memory 10, the unpacking circuit 4 does not unpack the bit stream, and the audio signal generating circuit 6 does not decode the bit stream.

Next, based on the header information obtained from the first frame and held in the header register 3, the frame length of the first frame is calculated, based on which the position of the synchronous bit field 61 in the second frame is determined. Then, when the synchronous bits "111111111111" in the second frame are detected in that position by the synchronous detecting circuit 2, this means that synchronization has been detected in two consecutive frames, the first frame and the second frame. At this point in time, the synchronous state register 8 is holding the second unlocked state 1b (outputting the signal "1" only from the output terminal T1b), so that the synchronous state controlling circuit 7 outputs to the synchronous state register 8 a signal indicating that the next state is the first locked state 2a. As a result, the synchronous state transits to the first locked state 2a, and the synchronous state register 8 outputs the signal "1" only from the output terminal T2a. At that time, the header information 62 in the second frame, other than the synchronous bits, is taken into the header register 3.

In the first locked state 2a, the synchronous state register 8 is outputting the signal "1" only from the output terminal T2a. Therefore, when the signal indicating the first locked state 2a is received from the synchronous state register 8, the unpacking instructing circuit 9 instructs the unpacking circuit 4 to unpack the inputted bit stream. The CRC detecting circuit 5 performs CRC error check on the unpacked data, and when no CRC errors are detected, the unpacked coded audio data is temporarily stored in the data memory 10 via the audio signal generating circuit 6, and then read out by the audio signal generating circuit 6 for decoding. The audio signal obtained by decoding the coded audio data by the audio signal generating circuit 6 is again stored in the data memory 10; then, the audio signal generating circuit 6 reads it at appropriate timing for outputting to the selector 14a. On the other hand, while the signal indicating the first locked state 2a is being inputted from the synchronous state register 8, the mute instructing circuit 12 does not output a signal for instructing muting to the selector 14a. Therefore, the audio signal read out by the audio signal generating circuit 6 from the data memory 10 is outputted as the audio output signal from the output terminal OUT via the selector 14a.

While the decoding of the second frame is being carried out, the synchronous detecting circuit 2 performs synchronous detection on the next third frame, and the synchronous state controlling circuit 7 generates the synchronous state of the third frame. When the synchronous detecting circuit 2 detects the synchronous bits "111111111111" in the synchronous bit field 61 of the third frame, the result from the synchronous detecting circuit 2 and the signal indicating the first locked state as the current state from the synchronous state register 8 are supplied to the synchronous state controlling circuit 7, so that the synchronous state controlling circuit 7 outputs a signal indicating the first locked state 1a as the next state, and supplies it to the synchronous state register 8. As a result, only the output terminal T2a of the synchronous state register 8 outputs the signal "1". Accordingly, the unpacking circuit 4 continues to unpack the inputted frame, and the selector 14a continues to select the audio signal read out from the data memory 10 by the audio signal generating circuit 6, for outputting from the output terminal OUT.

When the decoding of the second frame of the coded audio data is completed, the decoding of the third frame of the coded audio data follows. When, thereafter, synchronization has been detected continuously through to the "n−1"th frame, the first locked state 2a will have been kept continuously during that time. Therefore, during that time, the unpacking circuit 4 continues to unpack the inputted frames one after another, while, on the other hand, the selector 14a continues to select the audio signal read out from the data memory 10 by the audio signal generating circuit 6, for outputting from the output terminal OUT.

Then, the "n"th frame is inputted via the input terminal IN, but since the "n"th frame carries the synchronous bits "111111011111", as previously noted, the synchronous detecting circuit 2 fails to detect synchronization. As a result of this detection failure, and in response to the signal being outputted from the synchronous state register 8, indicating that the current synchronous state (the state of the "n−1"th frame) is the first locked state 2a, the synchronous state controlling circuit 7 outputs a signal indicating that the state of the next "n"th frame is the second locked state 2b. In response to this signal, the synchronous state register 8 outputs the signal "1" only from the output terminal T2b.

However, since the second locked state 2b is a locked state in which synchronization is still locked, and since the signal "1" is outputted only from the output terminal T2b of the synchronous state register 8, the output signal of the unpacking instructing circuit 9 and the mute instructing circuit 12 both become "1". The unpacking instructing circuit 9 thus outputs the signal "1" of the unpacking instructing signal; as a result, the inputted bit stream of the "n"th frame is unpacked by the unpacking circuit 4, and the coded audio data is extracted from the audio data field 53 and temporarily stored in the data memory 10 via the audio signal generating circuit 6, after which the stored data is read out and decoded by the audio signal generating circuit 6, the resulting audio data being stored again in the data memory 10. The mute instructing circuit 12 also outputs the signal "1" of the mute instructing signal; as a result, the selector 14a selects the output of the mute circuit 13 so that the mute data is outputted from the output terminal OUT, instead of the audio signal obtained from the audio data field 53 in the "n"th frame.

During the decoding (muting) of the "n"th frame is being performed, the synchronous detecting circuit 2 performs synchronous detection of the next "n+1"th frame, and the synchronous state controlling circuit 7 generates the synchronous state of the next "n+1"th frame.

Since the synchronous bits of the "n+1"th frame are "111111111110", the synchronous detecting circuit 2 again fails to detect synchronization. As a result of this detection failure, and in response to the signal being outputted from the synchronous state register 8, and indicating that the current synchronous state (the state for the "n"th frame) is the second locked state 2b, the synchronous state controlling circuit 7 outputs a signal indicating that the state of the next "n+1"th frame is the third locked state 2c. In response to this signal, the synchronous state register 8 outputs the signal "1" only from the output terminal T2c.

However, since the third locked state 2c also is a locked state in which synchronization is still locked, and since the signal "1" is outputted only from the output terminal T2c of the synchronous state register 8, the output signals of the unpacking instructing circuit 9 and the mute instructing circuit 12 both become "1", as in the case of its immediately preceding "n"th frame. The unpacking instructing circuit 9 thus outputs the signal "1" of the unpacking instructing signal; as a result, the inputted bit stream in the "2n+1"th frame is unpacked by the unpacking circuit 4, and the coded audio data is extracted from the audio data field 53 and temporarily stored in the data memory 10 via the audio signal generating circuit 6, after which the stored data is read out and decoded by the audio signal generating circuit 6, the resulting audio data being stored again in the data memory 10. On the other hand, the mute instructing circuit 12 also outputs the signal "1" of the mute instructing signal; as a result, the selector 14a selects the output of the mute circuit 13 so that the mute data is outputted from the output terminal OUT, instead of the audio signal obtained from the "n+1"th frame.

In the synchronous detection of the next "n+2"th frame, when the synchronous detecting circuit 2 detects the correct synchronous bits, the synchronous state of the "n+2"th frame returns to the first locked state 2a, but when it fails to detect synchronization, the state returns to the first unlocked state 1a as the initial state.

In the case where the synchronous detection has failed and the state has returned to the first unlocked state 1a, a signal indicating the first unlocked state 1a is given to the synchronous state register 8 from the synchronous state controlling circuit 7, and the synchronous state register 8 outputs the signal "1" only from the output terminal T1a. Since this signal is given to the memory initialization instructing circuit 11 as a memory initializing signal, the memory initialization instructing circuit 11 instructs the initialization of the data memory 10, and the data memory 10 is initialized. During the initialization of the data memory 10, the synchronous detection operation in the synchronous detecting circuit 2 is interrupted, and will again performed by the synchronous detecting circuit 2 after the initialization of the data memory 10 is completed.

As described above, in the conventional audio decoding circuit, when transitions are made from the first locked state 2a to the first unlocked state 1a after failing to achieve synchronization, the data memory has to be initialized during the period of the first unlocked state 1a before the next synchronous detection can be initiated. Hence, the problem that an extra time is required for initialization of the data memory.

Furthermore, in the conventional synchronous detection method, in the first unlocked state 1a, the inputted bit stream is checked by shifting bit by bit, until the whole bit stream "111111111111" is detected by the synchronous detecting circuit 2. Once synchronization has been detected, a transition is made to the next second unlocked state 1b; then, the frame length of the current frame is calculated from the header information following the bit stream "111111111111", to determine the synchronous bit position in the next frame, based on which the synchronous detecting circuit 2 judges whether the synchronous bits "111111111" are located there.

Accordingly, in the first unlocked state 1a, when a bit stream "111111111111" identical to the synchronous bit pattern is located anywhere within the bit stream other than the position originally the synchronous bits are located, synchronization is erroneously detected and a transition is made to the second unlocked state 1b. Furthermore, when it is attempted to detect synchronization by referencing the synchronous bit position in the next frame determined based on the erroneous synchronous detection, synchronization cannot be detected and the state returns back to the first unlocked state 1a. This therefore presents the problem that, in the case of an inputted bit stream containing many bit patterns consisting of 12 successive "1" ("111111111111") somewhere other than the synchronous bit position, it is difficult to correctly achieve synchronization and it takes time to enter a locked state.

SUMMARY OF THE INVENTION

The present invention has been devised to solve the above-mentioned problems, and a primary object of the invention is to provide a technique capable of reducing the time for data memory initialization that becomes necessary when a transition is made from a synchronized state to an asynchronous state.

It is another object of the invention to provide a synchronous control technique capable of minimizing the possibility of erroneous detection in the judgment of synchronous detection when information is inputted that contains a bit stream having the same contents as synchronous information.

It is a further object of the invention to provide a technique capable of avoiding unnecessary processing by making provisions not to perform synchronous detection when an error is contained in the frame to be processed.

A coded-signal decoding circuit of the invention which processes a bit stream consisting of a plurality of successive frames each including sample data of a coded signal to be decoded, and synchronous information indicating a starting position of a frame as a unit of processing, comprising: decoding means for decoding the sample data in each frame of the bit stream; synchronous state holding means for holding information indicating a synchronized state or an asynchronous state, and a transition state therebetween, and for outputting a state signal indicating the state; synchronous detecting means for detecting whether the state is the synchronized state or the asynchronous state on the basis of the synchronous information included in the inputted bit stream, and for outputting the detection result as a synchronous detecting signal; synchronous state controlling means for judging the next synchronous state on the basis of the synchronous detecting signal outputted from the synchronous detecting means and the state signal outputted from the synchronous state holding means, and for making the synchronous state holding means hold the judgment result;

storing means, whose stored contents are initialized in the asynchronous state, for storing decoded signals obtained by the decoding means and for outputting the decoded signals at predetermined timing; initial data generating means for generating data which makes the stored contents of the storing means be an initial state; and storing means initializing means for storing the data generated by the initial data generating means instead of an output of the decoding means, when the synchronous state holding means outputs the state signal indicating the transition state from the synchronized state to the asynchronous state.

A coded-signal decoding circuit of the invention which processes a bit stream consisting of a plurality of successive frames each including sample data of a coded signal to be decoded, and header information having synchronous information indicating a starting position of a frame as a unit of processing and information indicating the frame as a first kind of frame consisting of a relatively small number of sample data per frame or a second kind of frame consisting of a relatively large number of sample data per frame, comprising: decoding means for decoding the sample data in each frame of the bit stream; header information extracting means for extracting the header information from each frame in the bit stream; synchronous state holding means for holding information indicating a synchronized state or an asynchronous state, and a transition state therebetween, and for outputting a state signal indicating the state; synchronous detecting means for detecting whether the state is the synchronized state or the asynchronous state on the basis of the synchronous information included in the header information extracted by the header information extracting means, and for outputting the detection result as a synchronous detecting signal; judging means for judging whether the frame is the first kind or the second kind on the basis of the header information extracted by the header information extracting means; synchronous state controlling means for, based on the judgment result by the judging means, the synchronous detecting signal outputted from the synchronous detecting means, and the state signal outputted from the synchronous state holding means, judging at least whether the next state is a first state indicating an initial state or indicating that the synchronized state has not been detected, a second state indicating that the synchronized state has been detected, a third state indicating that the synchronized state has not been detected in the second state when the contents of the header information indicates the frame is the first kind of frame, or a fourth state indicating that the synchronized state has not been detected in the second state when the contents of the header information indicates the frame is the second kind of frame, and for making the synchronous state holding means hold the judgment result; storing means, whose stored contents are initialized in the asynchronous state, and which has a storage capacity at least corresponding to the number of sample data of the second kind of frame, for storing decoded signals obtained by the decoding means and for outputting the decoded signals at predetermined timing; initial data generating means for generating data which makes the stored contents of the storing means be an initial state; and storing means initializing means for storing the data generated by the initial data generating means instead of an output of the decoding means, when the judging means has judged that the frame currently being processed is the first kind, and the synchronous state holding means has detected the third state or the fourth state, or when the judging means has judged that the frame currently being processed is the second kind, and the synchronous state holding means has detected the fourth state.

A coded-signal decoding circuit of the invention in which each frame includes error detection information for detecting an error in each frame, the synchronous detecting means comprising: synchronous information detecting means for detecting the synchronous information included in the inputted bit stream; error judging means for judging the presence or absence of an error by extracting the error detection information from each frame in the bit stream; and synchronous judging means for judging whether the state is synchronized state or asynchronous state on the basis of the synchronous information detected by the synchronous information detecting means, only when the error judging means has judged that no errors are included.

A synchronous control method of the invention for a coded-signal decoding circuit which processes a bit stream consisting of a plurality of successive frames each including sample data of a coded signal to be decoded, and header information having synchronous information indicating a starting position of a frame as a unit of processing and information indicating the frame as a first kind of frame consisting of a relatively small number of sample data per frame or a second kind of frame consisting of a relatively large number of sample data per frame, comprising the steps of: extracting the header information from each frame in the bit stream; detecting whether the state is a synchronized state or an asynchronous state on the basis of the synchronous information included in the extracted header information; judging whether the frame is the first kind or the second kind on the basis of the extracted header information; and performing synchronous control, based on the judgment result on the kind of frame, the synchronous detection result, and the current state, by judging at least whether the next state is a first state indicating an initial state or indicating that the synchronized state has not been detected, a second state indicating that the synchronized state has been detected, a third state indicating that the synchronized state has not been detected in the second state when the contents of the header information indicates the frame is the first kind, or a fourth state indicating that the synchronized state has not been detected in the second state when the contents of the header information indicates the frame is the second kind.

A synchronous control method of the invention in which each frame includes error detection information for detecting an error in each frame, the synchronous information included in the inputted bit stream is detected, the presence or absence of an error is judged by extracting the error detection information from each frame in the bit stream, and synchronization has been detected, only when the synchronous information has been detected and the frame has been judged as including no errors.

The above and further objects and features of the invention will more fully be apparent from the following detailed description with accompanying drawings.

BRIEF DESCRIPTION OF THE DRAWINGS

FIG. 8 is a block diagram showing a configuration of an MPEG audio decoding circuit as ail example of the coded-signal decoding circuit according to a third embodiment of the present invention.

DESCRIPTION OF THE PREFERRED EMBODIMENTS

Figure 1:
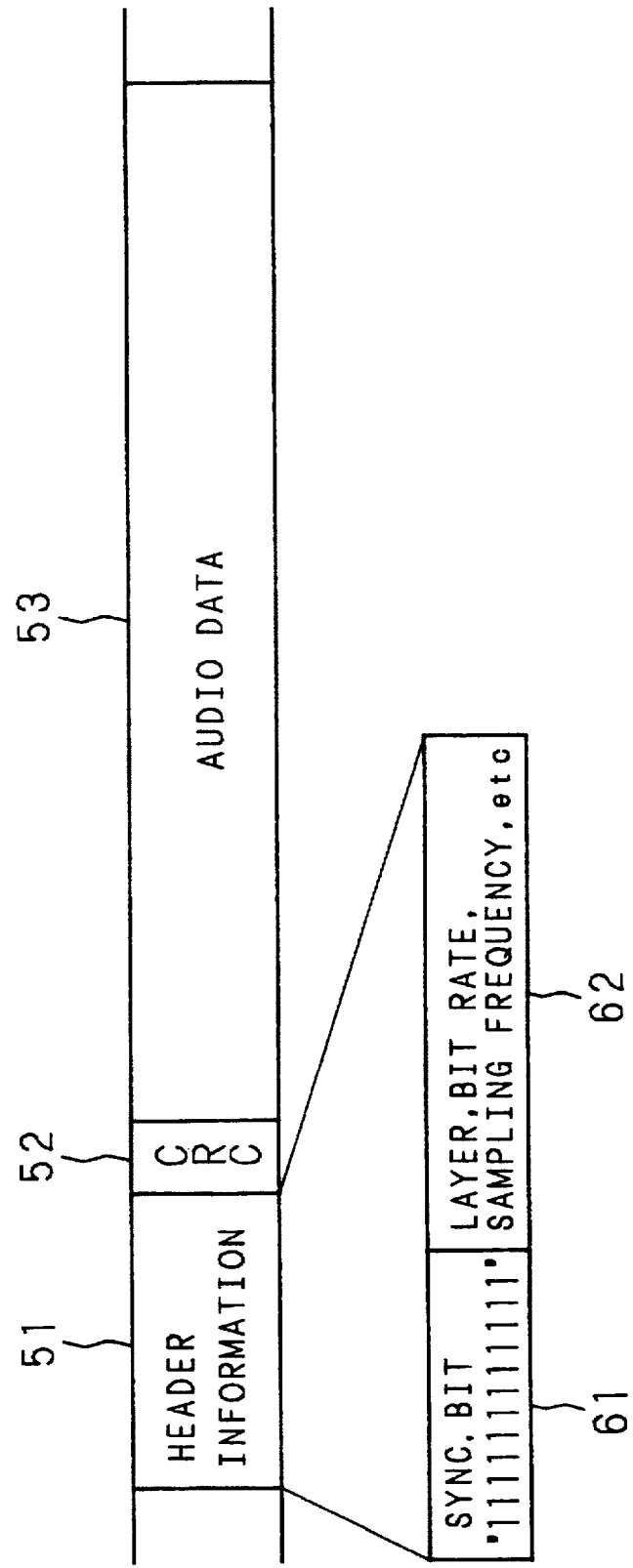
FIG. 1 is a schematic diagram showing an example of a format structure of an MPEG audio bit stream to be processed by the present invention and a conventional example.
Figure 2:
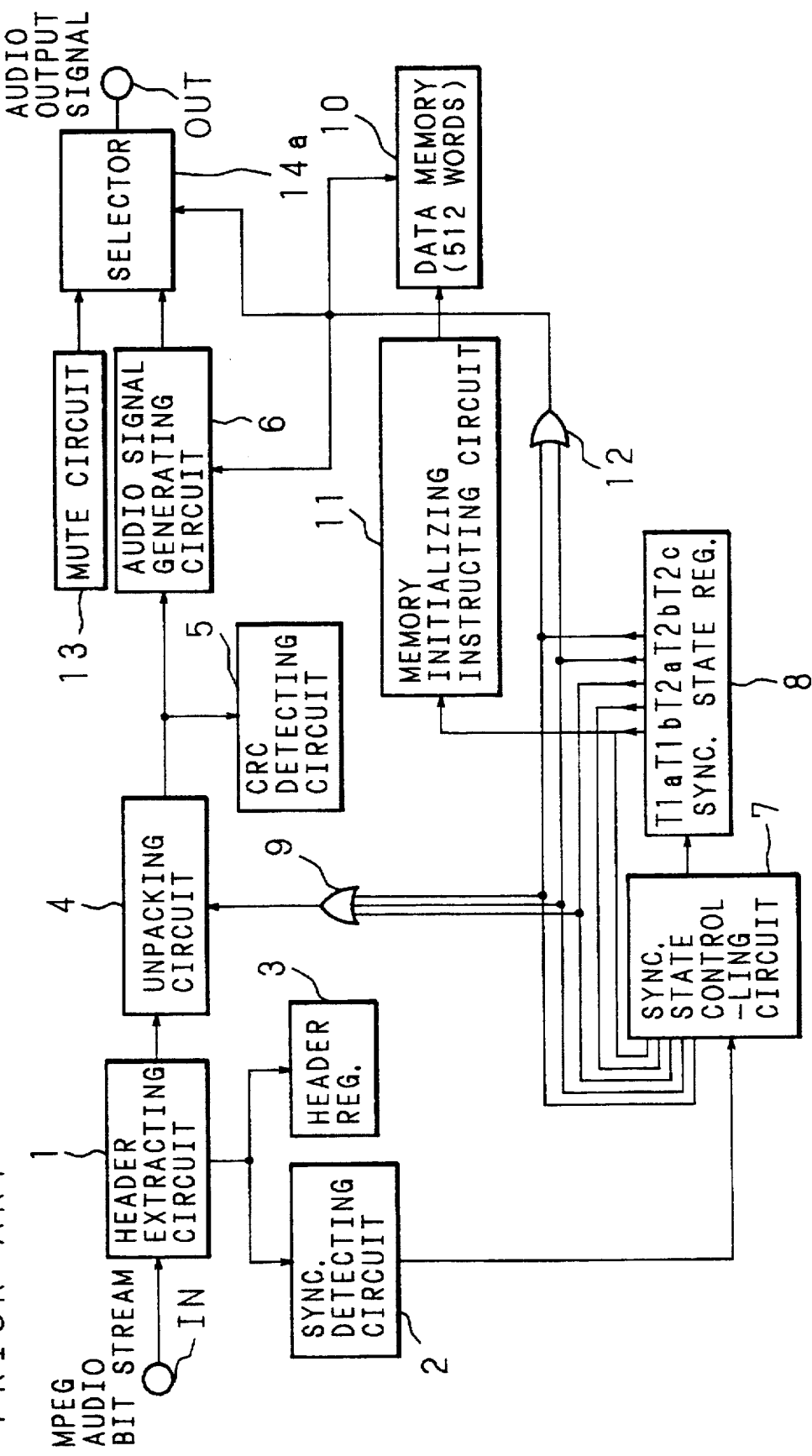
FIG. 2 is a block diagram showing a configuration of an MPEG audio decoding circuit as an example of a conventional coded-signal decoding circuit.

The present invention will be described in detail below with reference to the accompanying drawings showing a preferred embodiments thereof. The invention is concerned with an audio decoding circuit for processing a coded digital audio signal, and also with a synchronous control method, a synchronous detection controlling circuit, and a synchronous detection control method for the same. A signal coded by an MPEG (Moving Picture Experts Group) audio signal coding method, whose coded frame structure is shown in FIG. 1, will be taken as an example of the signal to be processed.

First Embodiment

Figure 5:
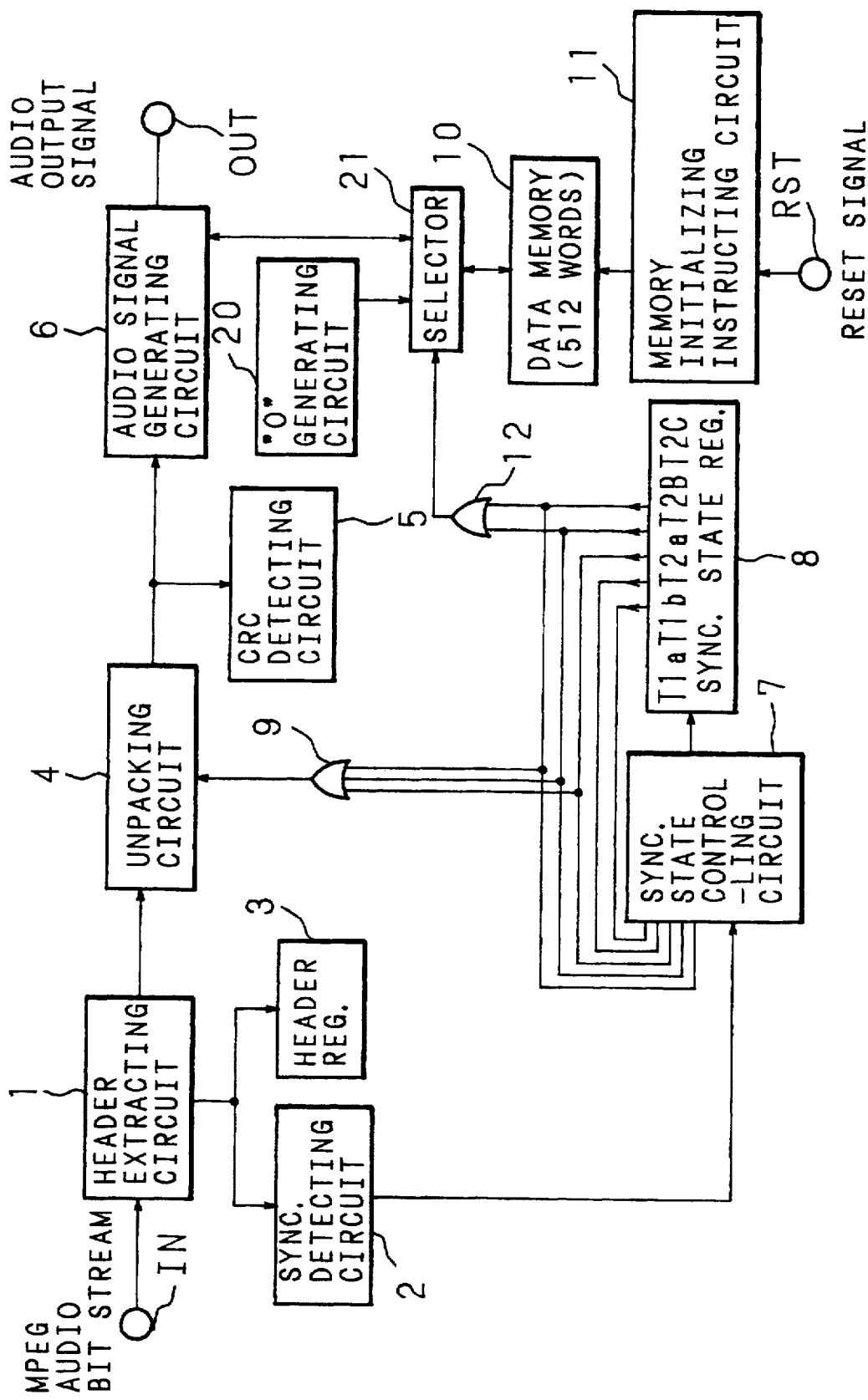
FIG. 5 is a block diagram showing a configuration of an MPEG audio decoding circuit as an example of the coded-signal decoding circuit according to the first embodiment of the present invention.

FIG. 5 is a block diagram showing a configuration example of an MPEG audio decoding circuit according to a first embodiment of the present invention. The description hereinafter given assumes that the bit stream to be processed includes a CRC check bit field 52.

In FIG. 5, reference symbol IN designates an input terminal for an MPEG audio bit stream, and OUT indicates an output terminal for an audio output signal. Radio waves of satellite broadcasts, recording media such as digital disks, etc. can be considered as the source of the MPEG audio bit stream inputted at the input terminal IN. The audio signal outputted at the output terminal OUT is a digital audio signal, which may be outputted as an analog signal after D/A conversion or may be outputted directly in digital form for recording on another recording medium.

Reference numeral 1 denotes a header extracting circuit which extracts the header information field 51 from the MPEG audio bit stream inputted via the input terminal IN. The header information field 51 extracted by the header extracting circuit 1 is supplied to a synchronous detecting circuit 2 and a header register 3. The CRC check bit field 52 and audio data field 53 in the inputted bit stream are passed through the header extracting circuit 1 and inputted directly into an unpacking circuit 4.

The synchronous detecting circuit 2 detects the synchronous bit field 61 from the header information field 51 extracted by the header extracting circuit 1, and judges the synchronization. The synchronous judgment result by the synchronous detecting circuit 2, that is, information indicating whether or not the 12 successive bits are all "1", is supplied to a synchronous state controlling circuit 7. On the other hand, the header register 3 holds the contents of the field 62, which is the field remaining after removing the synchronous bit field 61 from the header information field 51 extracted by the header extracting circuit 1.

The unpacking circuit 4 unpacks (decomposes) the bit stream outputted from the header extracting circuit 1 into the CRC check bit field 52 and audio data field 53 in accordance with an instruction from an unpacking instruction circuit 9 (to be described later). The data unpacked by the unpacking circuit 4 is supplied to a CRC detecting circuit 5 and an audio signal generating circuit 6.

The CRC detecting circuit 5 takes in the CRC check bit field 52 from the data outputted from the unpacking circuit 4, and checks errors.

The audio signal generating circuit 6 serves multiple functions, as in the previously described conventional example, that is, to transfer data between the unpacking circuit 4, a selector 21, and the output terminal OUT, and to decode the coded audio data.

More specifically, the audio signal generating circuit 6 performs the following three functions: the first function is to temporarily store the coded audio data unpacked by the unpacking circuit 4 into a data memory 10 via the selector 21; the second function is to decode the coded audio data by reading it from the data memory 10 via the selector 21 and to store the decoded audio signal again into the data memory 10 via the selector 21; and the third function is to read out the decoded audio signal stored in the data memory 10 via the selector 21 and to output it to the output terminal OUT.

In this way, the data memory 10 not only stores temporarily the coded audio data unpacked by the unpacking circuit 4 and transferred via the audio signal generating circuit 6 and selector 21, but also stores the audio signal decoded from that data by the audio signal generating circuit 6. Such data transfer between the audio signal generating circuit 6 and the data memory 10 via the selector 21 is performed to adjust the final output timing of the audio signal.

A "0" generating circuit 20 is constantly generating a signal of data "0", and outputs it to the selector 21.

Accordingly, when the selector 21 connects the audio signal generating circuit 6 and the data memory 10, the coded audio data outputted from the unpacking circuit 4 is stored into the data memory 10 via the audio signal generating circuit 6, and in the reverse direction, the coded audio data stored in the data memory 10 is transferred back to the audio signal generating circuit 6 for decoding. On the other hand, when the selector 21 connects the "0" generating circuit 20 and the data memory, data "0" generated by the "0" generating circuit 20 is stored in the data memory 10.

Based on the synchronous judgment result of the by the synchronous detecting circuit 2 and a synchronous state currently held in the synchronous state register 8 hereinafter described, the synchronous state controlling circuit 7 generates one of five states (two unlocked states and three locked states which will be described later) as the next synchronous state. Details of the transition between states will be described later. The synchronous state generated by the synchronous state controlling circuit 7 is supplied to the synchronous state register 8.

The synchronous state register 8 holds the synchronous state generated by the synchronous state controlling circuit 7; the synchronous state thus held is not only supplied to the unpacking instructing circuit 9 and mute instructing circuit 12, but fed back to the synchronous state controlling circuit 7. More specifically, the synchronous state register 8 comprises signal output terminals T1a, T1b, T2a, T2b, and T2c, respectively corresponding to the five states; of these output terminals T1a, T1b, T2a, T2b, and T2c, one output terminal corresponding the synchronous state given from the synchronous state controlling circuit 7 outputs a signal "1", and the other output terminals each output a signal "0".

The unpacking instructing circuit 9 issues an unpacking instruction to the unpacking circuit 4 when the contents of the synchronous state register 8 show a locked state under which a synchronized condition is established. More specifically, the unpacking instructing circuit 9 is constructed from a three-input OR gate, and output signals from the output terminals T2a, T2b, and T2c, one of which outputs signal "1" when an unlocked state is detected, of the synchronous state register 8 is supplied. In this arrangement, when the signal "1" is outputted from one of the output terminals T2a, T2b, and T2c, the unpacking instructing circuit 9 supplies the signal "1" to the unpacking circuit 4, instructing it to unpack.

When the unpacking instruction is given from the unpacking instructing circuit 9, the unpacking circuit 4 unpacks (decomposes) the bit stream, which is outputted from the header extracting circuit 1, into the CRC check bit field 52 and audio data field 53, as previously described.

The mute instructing circuit 12 outputs a mute instructing signal when the contents of the synchronous state register 8 show a specific state indicating a synchronized condition. More specifically, the mute instructing circuit 12 is constructed from a two-input OR gate, and output signals from the output terminals T2b and T2c, one of which outputs signal "1" when an unlocked state is detected, of the synchronous state register 8 is supplied. In this arrangement, when the signal "1" is outputted from one or the other of the output terminals T2b and T2c, the mute instructing circuit 12 outputs the signal "1". The signal "1" outputted from the mute instructing circuit 12 is supplied to the selector 21 as the mute instructing signal used to control its selection operation.

A memory initialization instructing circuit 11, when a reset signal is inputted from a reset terminal RST, outputs an initializing signal to initialize the contents of the data memory 10.

Next, the basic operation of the above-configured MPEG audio decoding circuit according to the first embodiment of the invention will be described. When the MPEG audio bit stream is inputted to the input terminal IN, the header extracting circuit 1 extracts the header information field 51, and the synchronous detecting circuit 2 detects the synchronous bit field 61. As the result, when the detection shows correct synchronization, the field 62, the remaining field after removal of the synchronous bit field 61, is extracted from the header information field 51; that is, various pieces of information necessary for decoding, such as the layer, the presence or absence of CRC, the bit rate, the sampling frequency, the channel mode, etc. are extracted and written to the header register 3.

Based on the synchronous detection result by the synchronous detecting circuit 2 and the synchronous state currently held in the synchronous state register 8, the synchronous state controlling circuit 7 generates the next synchronous state and makes the synchronous state register 8 hold it.

When the contents of the synchronous state register 8 show a locked state indicating a synchronized condition, the unpacking instructing circuit 9 outputs an unpacking instructing signal, in response to which the unpacking circuit 4 unpacks the inputted bit stream. When the optional CRC check bits are contained in the inputted frame, a CRC check circuit 3 performs an error check, and the coded audio data is then decoded by the audio signal generating circuit 6 and outputted as an audio signal from the output terminal OUT.

Figure 3:
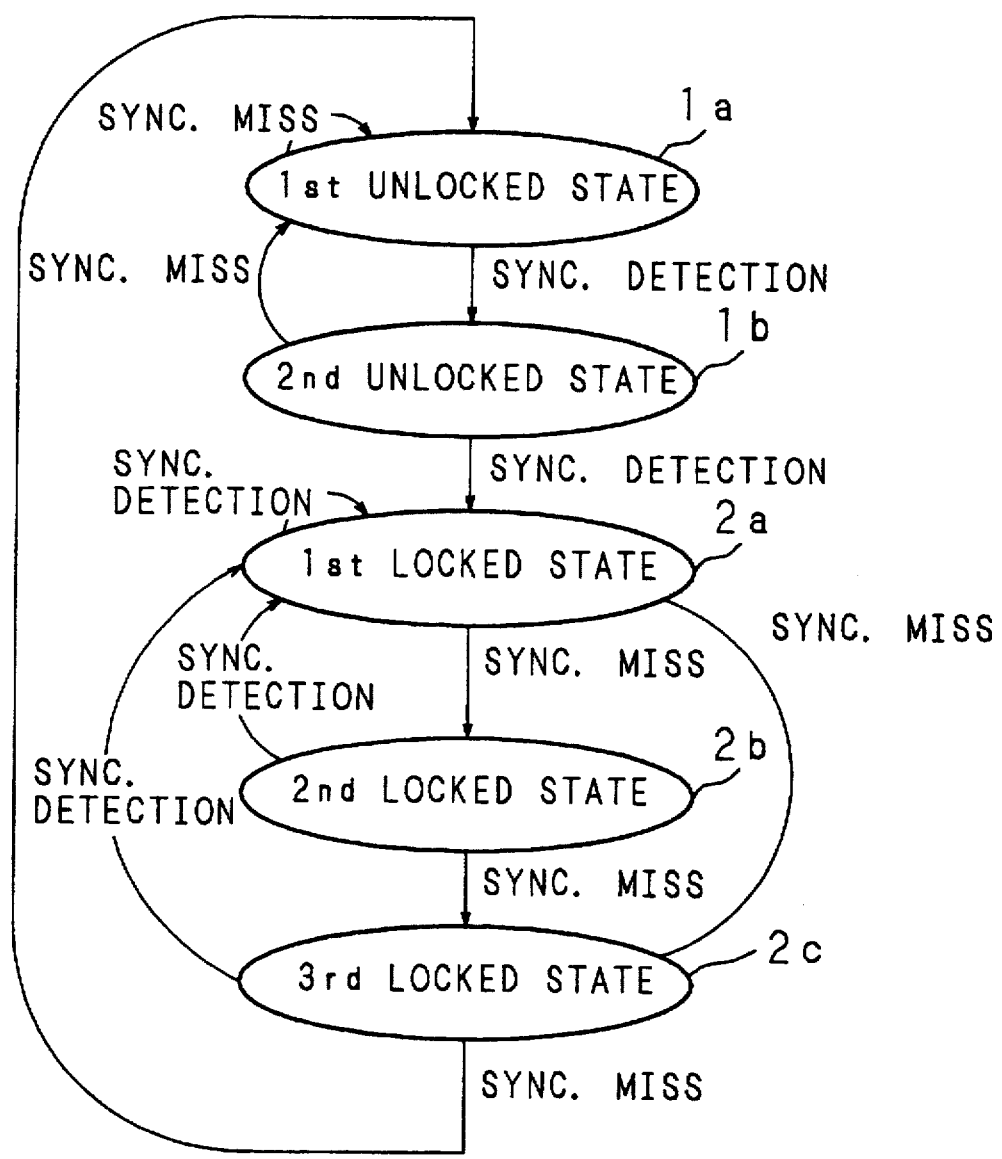
FIG. 3 is a schematic diagram showing synchronous state transitions according to the prior art and according to a first embodiment of the coded-signal decoding circuit of the present invention.

The synchronous detection method and the transition between synchronous states for the MPEG audio decoding circuit according to the first embodiment of the invention are fundamentally the same as those in the conventional example shown in the transition diagram of FIG. 3. More specifically, there are five states, that is, two unlocked states, the first unlocked state 1a and the second unlocked state 1b, and three locked states, the first locked state 2a, the second locked state 2b, and the third locked state 2c. However, the operation in each state is somewhat different from the conventional example, as will be described below.

The first unlocked state 1a is the initial state, the state in which synchronization is not detected in the initial state, or also the state in which synchronization is not detected in the third locked state 2c, that is, an unlocked state indicating an asynchronous condition. In this state, the signal "1" is outputted only from the output terminal T1a of the synchronous state register 8, and a signal "0" is outputted from each of the other output terminals T1b, T2a, T2b, and T2c. Accordingly, the output signals of the unpacking, instructing circuit 9 and the mute instructing circuit 12 both become "0", so that neither the unpacking instruction to the unpacking circuit 4 nor the mute instruction is issued, and the selector 21 connects the audio signal generating circuit 6 and the data memory 10. Next to the first unlocked state 1a, when synchronization is not detected, the same state is retained, but when synchronization is detected, a transition is made to the second unlocked state 1b.

The second unlocked state 1b is an unlocked state in which the synchronous state of the preceding frame is the first unlocked state 1a and in which synchronization is detected in the current synchronous detection operation but the coded audio data is not decoded yet. In this state, the signal "1" is outputted only from the output terminal T1b of the synchronous state register 8, and a signal "0" is outputted from each of the other output terminals T1a, T2a, T2b, and T2c. Accordingly, the output signals of the unpacking instructing circuit 9 and the mute instructing circuit 12 both become "0", so that neither the unpacking instruction to the unpacking circuit 4 nor the mute instruction is issued, and the selector 21 connects the audio signal generating circuit 6 and the data memory 10. Next to the second unlocked state 1b, when synchronization is not detected, a transition is made back to the first unlocked state 1a, but when synchronization is detected, a transition is made to the first locked state 2a.

The first locked state 2a is a locked state in which the synchronous state of the preceding frame is either one of the first to third locked states 2a, 2b, and 2c, or the second unlocked state 1b, and in which synchronization is detected in the current synchronous detection operation. In this state, the signal "1" is outputted only from the output terminal T2a of the synchronous state register 8, and a signal "0" is outputted from each of the other output terminals T1a, T1b, T2b, and T2c. Accordingly, the output signal of the unpacking instructing circuit 9 becomes "1", thus issuing an unpacking instruction to the unpacking circuit 4 which in response unpacks the inputted frame; on the other hand, since the output signal of the mute instructing circuit 12 becomes "0", no mute instruction is issued, and the selector 21 connects the audio signal generating circuit 6 and the data memory 10. Next to the first locked state 2a, when synchronization is not detected, a transition is made to the second locked state 2b, but when synchronization is detected, the same state is retained.

The second locked state 2b is a locked state in which the synchronous state of the preceding frame is the first locked state 2a and in which synchronization is not detected in the current synchronous detection operation. In this state, the signal "1" is outputted only from tile output terminal T2b of the synchronous state register 8, and signal "0" is outputted from each of the other output terminals T1a, T1b, T2a, and T2c. Accordingly, the output signal of the unpacking instructing circuit 9 becomes "1", instructing the unpacking circuit 4 to unpack the inputted frame; the output signal of the mute instructing circuit 12 also becomes "1", mute instruction is issued, and selector 21 connects the "0" generating circuit 20 and the data memory 10. Next to the second locked state 2b, when synchronization is not detected, a transition is made to the third locked state 2c, but when synchronization is detected, a transition is made back to the first locked state 2a.

The third locked state 2c is a locked state in which the synchronous state of the preceding frame is the second locked state 2b and in which synchronization is not detected in the current synchronous detection operation. In this state, the signal "1" is outputted only from the output terminal T2c of the synchronous state register 8, and the signal "0" is outputted from each of the other output terminals T1a, T1b, T2a, and T2b. Accordingly, the output signal of the unpacking instructing circuit 9 becomes "1", instructing the unpacking circuit 4 to unpack the inputted frame; the output signal of the mute instructing circuit 12 also becomes "1", mute instruction is issued, and the selector 21 connects the "0" generating circuit 20 and the data memory 10. Next to the third locked state 2c, when synchronization is not detected, a transition is made to the first unlocked state 1a, but when synchronization is detected, a transition is made to the first locked state 2a.

In this way, when synchronization has been detected two consecutive times, starting from the first unlocked state 1a which is the initial state, the state will have transited through the second unlocked state 1b to the first locked state 2a, thus entering a locked state. As long as synchronization continues to be detected in the first locked state 2a, the locked state (the first locked state 2a) is kept. Conversely, when synchronization has not been detected three consecutive times, starting from the first locked state 2a, the state will have transited to the first unlocked state 1a through the second locked state 2b and the third locked state 2c, thus entering an unlocked state (the first unlocked state 1a). However, even when synchronization is not detected from the first locked state 2a, when synchronization is detected in the second locked state 2b or the third locked state 2c, it returns to a locked state (the first locked state 2a).

It is assumed here that the muting processing is performed in a locked state (second locked state 2b and third locked state 2c) of a frame where synchronization has not been detected.

Next, the operation of the MPEG audio decoding circuit involving state transitions, according to the first embodiment of the invention, will be described with reference to the schematic diagram of FIG. 4 which shows an example of the inputted bit stream, as in the previously described conventional example. In the example shown in FIG. 4, it is assumed that the synchronous bit field 61 in each of the first to "n-1"th frames carries the correct bit pattern "111111111111", while the synchronous bit field 61 in each of subsequent frames carries an incorrect bit pattern because of an error caused, for example, by noise. More specifically, the synchronous bit field 61 in the "n"th frame shows "111111011111", the synchronous bit field 61 in the "n+1"th frame shows "111111111110", and the synchronous bit field 61 in the "n+2"th frame shows "111111111 . . . ".

In the MPEG audio decoding circuit according to the first embodiment of the invention, when synchronization has been detected two consecutive times from the first unlocked state 1a which is the initial state, in other words, when the synchronous bit field 61 in each of two consecutive frames contains a bit pattern of all "1", then it is determined that synchronization has been achieved (locked), and a decoding process is performed.

When power is turned on to an apparatus including the MPEG audio decoding circuit according to the first embodiment of the invention, a reset signal is applied to the reset terminal RST and the memory initialization instructing circuit 11 initializes the data memory 10, which also initializes the synchronous state to the first unlocked state 1a. In this state, the synchronous state register 8 is outputting the signal "1" only from the output terminal T1a. Since the signal "1" is not given to the unpacking instructing circuit 9 nor to the mute instructing circuit 12, neither the unpacking operation nor the mute operation is performed. During the initialization of the data memory 10, the synchronous detection operation in the synchronous detecting circuit 2 is interrupted, and will not be started after initiated until the initialization of the data memory 10 is completed.

Figure 4:
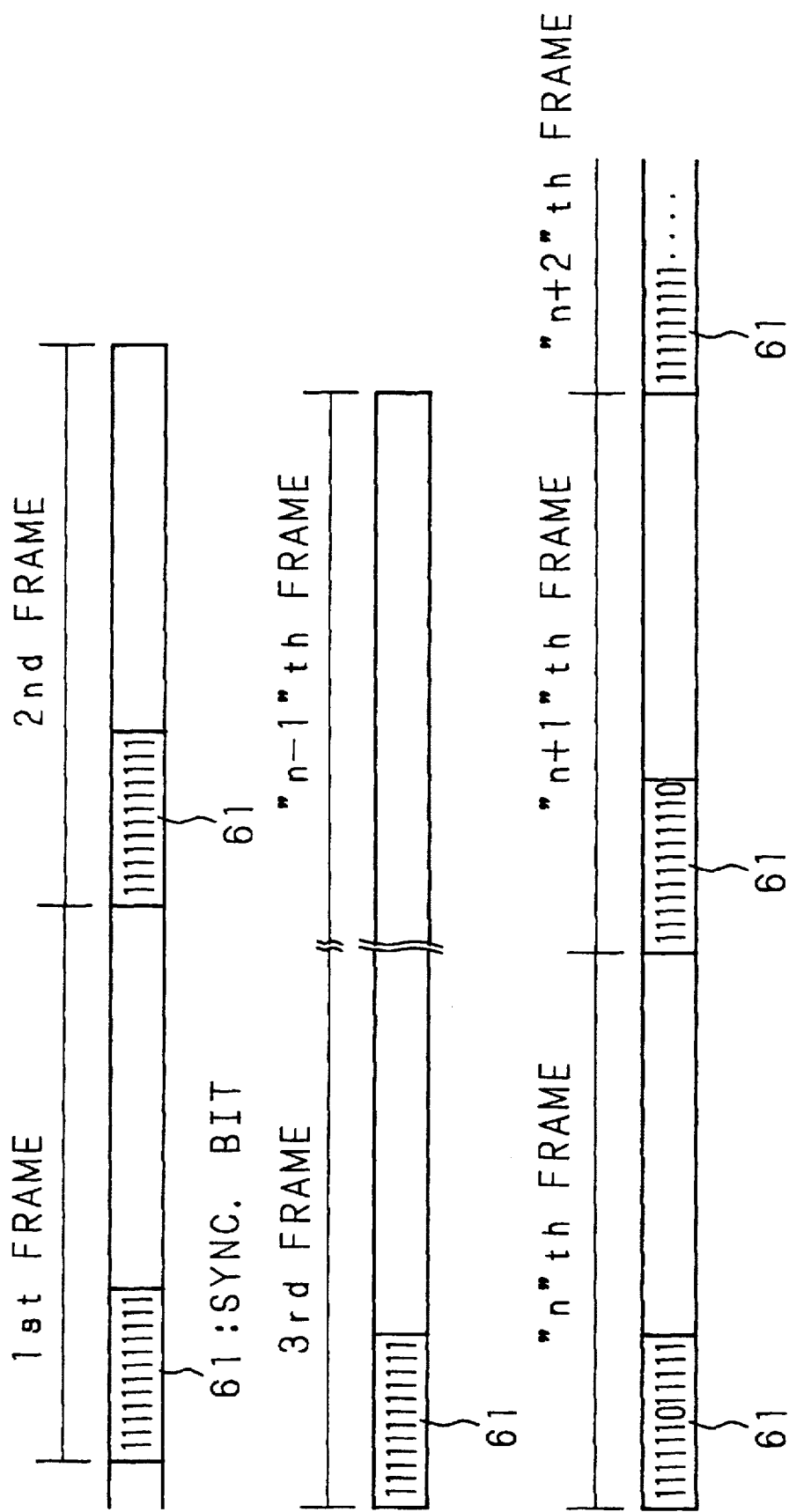
FIG. 4 is a schematic diagram showing an example of an inputted bit stream to be processed by the present invention and the prior art.

Then, when the bit stream shown in FIG. 4 is inputted under the first unlocked state 1a, the synchronous detecting circuit 2 detects that the 12 bits carried in the synchronous bit field 61 in the first frame are all "1", that is, the correct synchronization is achieved. At this point in time, the synchronous state register 8 is holding the first unlocked state 1a (outputting the signal "1" only from the output terminal T1a), so that the synchronous state controlling circuit 7 outputs to the synchronous state register 8 a signal indicating that the next state is the second unlocked state 1b. As a result, the synchronous state transits to the second unlocked state 1b, and the synchronous state register 8 outputs the signal "1" only from the output terminal T1b. In the meantime, the header information in the field 62, other than the synchronous bits, are written to the header register 3.

In practice, the synchronous detection by the synchronous detecting circuit 2 is performed as follows: in the first unlocked state 1a under which no synchronization is achieved, the inputted bit stream is checked by shifting bit by bit, and when a bit sequence "111111111111" is detected in other words, when a succession of twelve times of "1" is inputted, it is determined that synchronization has been detected. Once synchronization has been detected, the synchronous detecting circuit 2 thereafter calculates the frame length of that frame from the header information following the bit stream "111111111111", and thereby determines the synchronous bit position in the next frame and judges whether or not the synchronous bits "111111111111" are located there.

Once the second unlocked state 1b is established in this way, the synchronous state register 8 outputs the signal "1" only from the output terminal T1b; therefore, the unpacking circuit 4 does not unpack the bit stream, and the audio signal generating circuit 6 does not decode the bit stream.

Next, based on the header information obtained from the first frame and held in the header register 3, the frame length of the first frame is calculated, based on which the position of the synchronous bit field 61 in the second frame is determined. Then, when the synchronous bits "111111111111" in the second frame are detected in that position by the synchronous detecting circuit 2, this means that synchronization has been detected in two consecutive frames, the first frame and the second frame. At this point in time, the synchronous state register 8 is holding the second unlocked state 1b (outputting the signal "1" only from the output terminal T1b), so that the synchronous state controlling circuit 7 outputs to the synchronous state register 8 a signal indicating that the next state is the first locked state 2a. As a result, the synchronous state transits to the first locked state 2a, and the synchronous state register 8 outputs the signal "1" only from the output terminal T2a. At that time, the header information 62 in the second frame, other than the synchronous bits, is taken into the header register 3.

In the first locked state 2a, the synchronous state register 8 is outputting the signal "1" only from the output terminal T2a. Therefore, when the signal indicating the first locked state 2a is received from the synchronous state register 8, the unpacking instructing circuit 9 instructs the unpacking circuit 4 to unpack the inputted bit stream. Even when the signal indicating the first locked state 2a is received from the synchronous state register 8, the mute instructing circuit 12 does not output a mute instructing signal; as a result, the selector 21 is controlled to connect the audio signal generating circuit 6 and the data memory 10.

In this condition, the CRC detecting circuit 5 performs a CRC error check on the data unpacked by the unpacking circuit 4, and when no CRC errors are detected, the unpacked coded audio data is passed through the audio signal generating circuit 6 and temporarily stored into the data memory 10 via the selector 21, and then read out by the audio signal generating circuit 6 for decoding. The audio signal obtained by decoding the coded audio data by the audio signal generating circuit 6 is again stored in the data memory 10 via the selector 21; then, the audio signal generating circuit 6 reads it at appropriate timing for outputting to the output terminal OUT.

While the decoding of the second frame is being carried out, the synchronous detecting circuit 2 performs synchronous detection on the next third frame, and the synchronous state controlling circuit 7 generates the synchronous state of the third frame. When the synchronous detecting circuit 2 detects the synchronous bits "111111111111" in the synchronous bit field 61 of the third frame, the result from the synchronous detecting circuit 2 and the signal indicating the first locked state as the current state from the synchronous state register 8 are supplied to the synchronous state controlling circuit 7, so that the synchronous state controlling circuit 7 outputs a signal indicating the second locked state 2b as the next state, and supplies it to the synchronous state register 8. As a result, only the output terminal T2a of the synchronous state register 8 continues to output the signal "1".

Therefore, when the signal indicating the first locked state 2a is received from the synchronous state register 8, the unpacking instructing circuit 9 instructs the unpacking circuit 4 to unpack the inputted bit stream. Even when the signal indicating the first locked state 2a is received from the synchronous state register 8, the mute instructing circuit 12 does not output a mute instructing signal; as a result, the selector 21 is controlled to connects the audio signal generating circuit 6 and the data memory 10. Accordingly, the unpacking circuit 4 continues to unpack the inputted frame, and the selector 21 continues to connect the audio signal generating circuit 6 and the data memory 10, so that the audio signal read out from the data memory 10 continues to be outputted from the output terminal OUT.

When the decoding of the second frame of the coded audio data is completed, the decoding of the third frame of the coded audio data follows. When, thereafter, synchronization has been detected continuously through to the "n−1"th frame, the first locked state 2a will have been kept continuously during that time. Therefore, during that time, the unpacking circuit 4 continues to unpack the inputted frames one after another, while, on the other hand, the selector 21 continues to select the audio signal read out from the data memory 10 by the audio signal generating circuit 6, for outputting from the output terminal OUT.

Then, the "n"th frame is inputted via the input terminal IN, but since tile "n"th frame carries the synchronous bits "111111011111", as previously noted, the synchronous detecting circuit 2 fails to detect synchronization. As a result of this detection failure, and in response to the signal being outputted from the synchronous state register 8, indicating that the current synchronous state (the state of the "n−1"th frame) is the first locked state 2a, the synchronous state controlling circuit 7 outputs a signal indicating that the state of the next "n"th frame is the second locked state 2b. In response to this signal, the synchronous state register 8 outputs the signal "1" only from the output terminal T2b.

However, since the second locked state 2b is a locked state in which synchronization is still locked, and since the signal "1" is outputted only from the output terminal T2b of the synchronous state register 8, the output signal of the unpacking instructing circuit 9 and the mute instructing circuit 12 both become "1". The unpacking instructing circuit 9 thus outputs the signal "1" of the unpacking instructing signal; as a result, the inputted bit stream of the "n"th frame is unpacked by the unpacking circuit 4, and the coded audio data is extracted from the audio data field 53 and given to the audio signal generating circuit 6. However, since the mute instruction circuit 12 also outputs the mute instructing signal of "1", the selector 21 is controlled to connect the "0" generating circuit 20 and the data memory 10.

As a result, instead of the coded audio data unpacked by the unpacking circuit 4, the data "0" generated by the "0" generating circuit 20 are sequentially stored in the data memory 10, and these data "0" are outputted as an audio signal of mute state from the output terminal OUT at the output timing of the audio signal corresponding to the "n"th frame.

During the decoding (muting) of the "n"th frame is being performed, the synchronous detecting circuit 2 performs synchronous detection of the next "n+1"th frame, and the synchronous state controlling circuit 7 generates the synchronous state of the next "n+1"th frame.

Since the synchronous bits of the "n+1"th frame are "1111111110", the synchronous detecting circuit 2 again fails to detect synchronization. As a result of this detection failure, and in response to the signal being outputted from the synchronous state register 8, and indicating that the current synchronous state (the state for the "n"th frame ) is the second locked state 2b, the synchronous state controlling circuit 7 outputs a signal indicating that the state of the next "n+1"th frame is the third locked state 2c. In response to this signal, the synchronous state register 8 outputs the signal "1" only from the output terminal T2c.

However, since the third locked state 2c also is a locked state in which synchronization is still locked, and since the signal "1" is outputted only from the output terminal T2c of the synchronous state register 8, the output signals of the unpacking instructing circuit 9 and the mute instructing circuit 12 both become "1", as in the case of its immediately preceding "n"th frame. The unpacking instructing circuit 9 thus outputs the signal "1" of the unpacking instructing signal; as a result, the inputted bit stream in the "2n+1"th frame is unpacked by the unpacking circuit 4, and the coded audio data is extracted from the audio data field 53 and given to the audio signal generating circuit 6. However, since the mute instructing circuit 12 also output the mute instructing signal of "1", the selector 21 is controlled to connect the "0" generating circuit 20 and the data memory 10.

As a result, as in the case of the "n"th frame, not the coded audio data unpacked by the unpacking circuit 4 but the data "0" generated by the "0" generating circuit 20 are sequentially stored in the data memory 10, and these data "0" are outputted as an audio signal of mute state from the output terminal OUT at the output timing of the audio signal corresponding to the "n+1"th frame.

In the synchronous detection of the next "n+2"th frame, when the synchronous detecting circuit 2 detects the correct synchronous bits, the synchronous state of the "n+2"th frame returns to the first locked state 2a, but when it fails to detect synchronization, the state returns to the first unlocked state 1a as the initial state.

Here, when the synchronous detection has failed, and when it is confirmed that the first unlocked state 1a has been established, the synchronous detecting circuit 2 immediately repeats the synchronous detection operation.

As described above, in the MPEG audio decoding circuit according to the first embodiment of the invention, when synchronous detection failed in a locked state, more specifically, when synchronous detection failed in the first locked state 2a or in the second locked state 2b, values being decoded by the audio signal generating circuit 6 are not stored into the data memory 10, but instead, the selector 21 stores the data "0" being generated by the "0" generating circuit 20 sequentially into the data memory 10, thus automatically accomplishing the initialization of the data memory 10. Accordingly, there is no need to initialize the data memory 10 each time when the first unlocked state 1a is established, and the synchronous detecting circuit 2 can immediately initiate the synchronous detection operation.

Furthermore, when the data "0" are stored in the data memory 10 in the above manner, the data "0" are outputted as an audio signal at the timing that the audio signal in the frame corresponding to the data "0" would be outputted from the output terminal OUT, thus simultaneously accomplishing the muting processing.

Second Embodiment

Figure 6:
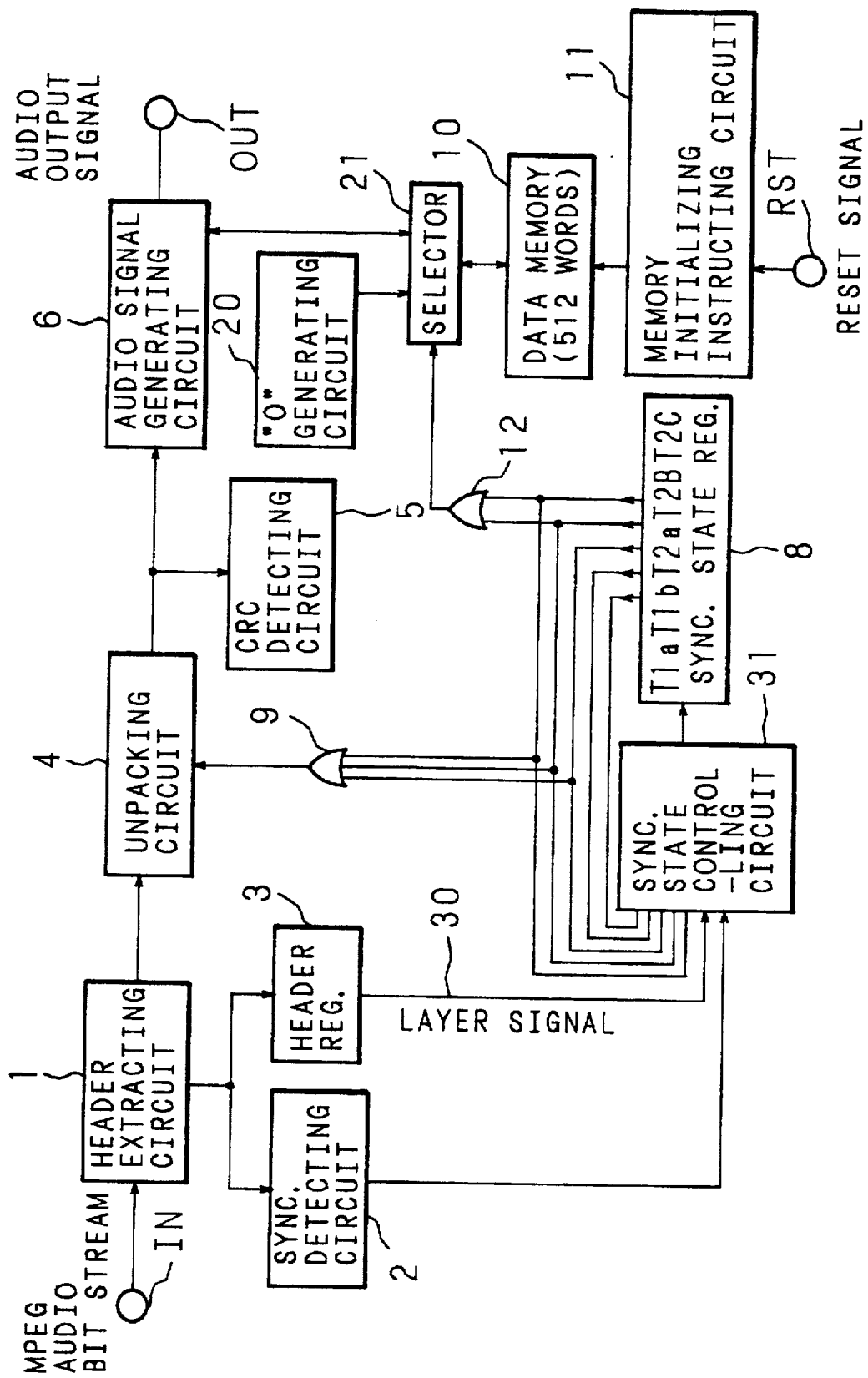
FIG. 6 is a block diagram showing a configuration of an MPEG audio decoding circuit as an example of the coded-signal decoding circuit according to a second embodiment of the present invention.

Next, an MPEG audio decoding circuit according to a second embodiment of the invention will be described with reference to the block diagram of FIG. 6 showing one example of the configuration thereof.

In FIG. 6, reference numerals 1 to 6, 8 to 12, and 20 and 21 designate the same component elements as those in the foregoing first embodiment. The second embodiment, however, is different from the first embodiment in that the header register 3 outputs a layer signal, indicated by reference numeral 30, that carries layer information. Further, reference numeral 31 designates a synchronous state controlling circuit which has a different function from that of the synchronous state controlling circuit shown by reference numeral 7 in FIG. 5. More specifically, the synchronous state controlling circuit 31 generates the next synchronous state, based on the synchronous detection result by the synchronous detecting circuit 2, the synchronous state currently held in the synchronous state register 8, and the layer signal 30.

The other component elements are the same as the corresponding elements in the first embodiment shown in FIG. 5, and therefore, explanation of such elements will not be repeated here.

The operation of the MPEG audio decoding circuit according to the second embodiment of the invention shown in FIG. 6 will be described next. The MPEG audio bit stream inputted via the input terminal IN is passed through the header extracting circuit 1, the unpacking circuit 4, and the audio signal generating circuit 6, and is temporarily stored in the data memory 10; then, the stored data is read out by the audio signal generating circuit 6 for decoding in the same manner as in the first embodiment, and the decoded data is again stored in the data memory 10 and then read out and outputted as an audio output signal from the output terminal OUT.

Figure 7:
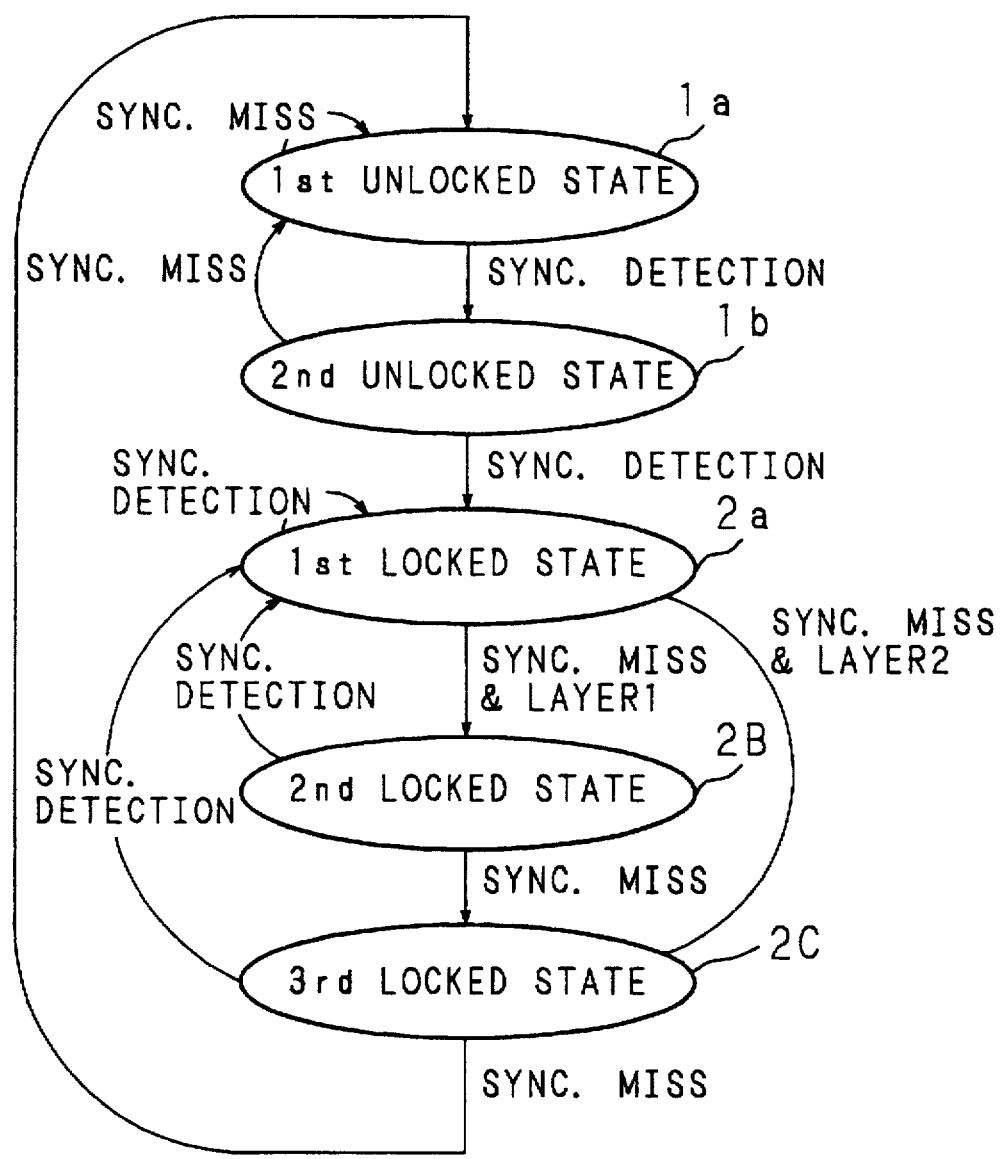
FIG. 7 is a schematic diagram showing synchronous state transitions according to the second embodiment of the coded-signal decoding circuit of the present invention.

The synchronous detection method and the transition between states according to the second embodiment will be described below with reference to the transition diagram shown in FIG. 7. In the second embodiment, it is assumed that there are five states, that is, two unlocked states, the first unlocked state 1a and the second unlocked state 1b, and three locked states, the first locked state 2a, the second locked state 2B, and the third locked state 2C.

The first unlocked state 1a, the second unlocked state 1b, and the first locked state 2a are the same as the corresponding states described in the first embodiment.

The second locked state 2B is a locked state in which the synchronous state of the preceding frame is the first locked state 2a and the layer signal 30 indicates Layer I, and in which synchronization is not detected in the current synchronous detection operation. In this state, the signal "1" is outputted only from the output terminal T2B of the synchronous state register 8, and the signal "0" is outputted from each of 5 the other output terminals T1a, T1b, T2a, and T2C. Accordingly, the output signal of the unpacking instructing circuit 9 becomes "1", instructing the unpacking circuit 4 to unpack the inputted frame; the output signal of the mute instructing circuit 12 also becomes "1", mute instruction is issued, and the selector 21 connects the "0" generating circuit 20 and the data memory 10. Next to the second locked state 2B, when synchronization is not detected, a transition is made to the third locked state 2C, but when synchronization is detected, a transition is made back to the first locked state 2a.

The third locked state 2C is a locked state in which either the synchronous state of the preceding frame is the second locked state 2B, or the synchronous state of the preceding frame is the first locked state 2a and the layer signal 30 does not indicate Layer I, and in which synchronization is not detected in the current synchronous detection operation. In this state, the signal "1" is outputted only from the output terminal T2C of the synchronous state register 8, and the signal "0" is outputted from each of the other output terminals T1a, T1b, T2a, and T2B. Accordingly, the output signal of the unpacking instructing circuit 9 becomes "1", instructing the unpacking circuit 4 to unpack the inputted frame; the output signal of the mute instructing circuit 12 also becomes "1", mute instruction is issued, and the selector 21 connects the "0", generating circuit 20 and the data memory 10. Next to the third locked state 2C, when synchronization is not detected, a transition is made to the first unlocked state 1a, but when synchronization is detected, a transition is made to the first locked state 2a.

In this way, when synchronization has been detected two consecutive times, starting from the first unlocked state 1a which is the initial state, the state will have transited through the second unlocked state 1b to the first locked state 2a, thus establishing a locked state. As long as synchronization continues to be detected in the first locked state 2a, the locked state (the first locked state 2a) is kept. However, when synchronization was not detected in the first locked state 2a and the layer signal 30 indicating Layer I, when synchronous detection has failed three consecutive times, including the detection failure in the first locked state 2a, the state will have transited to the first unlocked state 1a through the second locked state 2B and the third locked state 2C, thus establishing an unlocked state (the first unlocked state 1a). On the other hand, when synchronization was not detected in the first locked state 2a and the layer signal 30 indicating Layer II, when synchronous detection has failed two consecutive times, including the detection failure in the first locked state 2a, the state will have transited to the first unlocked state 1a through the third locked state 2C, thus establishing an unlocked state (the first unlocked state 1a).

It is assumed here that the muting processing is performed in a locked state (second locked state 2B and third locked state 2C) of a frame where synchronization has not been detected.

Next, the operation of the MPEG audio decoding circuit according to the second embodiment of the invention will be described with reference to FIG. 4 which shows an example of the inputted bit stream. However, the state transitions from the first unlocked state 1a as the initial synchronous state, to the first locked state 2a of the third frame, and the decoding operation performed there are the same as those described in the first embodiment, and their explanation will not be repeated here.

Thereafter, synchronization is detected continuously through to the "n−1"th frame, but in the synchronous detection in the next "n"th frame, since the synchronous bits are "11111011111", the synchronous detecting circuit 2 fails to detect synchronization. The header information extracted by the header extracting circuit 1, excluding the synchronizing bits, is stored in the header register 3, and the layer information held in the header register 3 is supplied as the layer signal 30 to the synchronous state controlling circuit 31.

At this time, when the layer signal 30 indicates Layer I, the synchronous state controlling circuit 31 outputs a signal indicating the second locked state 3B as the synchronous state of the "n"th frame, based on the synchronous detection result by the synchronous detecting circuit 2 and on the signal currently held in the synchronous state register 8, indicating the first locked state 2a which is the synchronous state of the "n−1"th frame. As a result, the synchronous state register 8 outputs the signal "1" only from the output terminal T2B.

However, since the second locked state 2B is a locked state in which synchronization is still locked, and since the signal "1" is outputted only from the output terminal T2B of the synchronous state register 8, the output signals of unpacking instructing circuit 9 and the mute instructing circuit 12 both become "1". The unpacking instructing circuit 9 thus outputs the signal "1" of the unpacking instructing signal; as a result, the inputted bit stream of the "n"th frame is unpacked by the unpacking circuit 4, and the coded audio data is extracted from the audio data field 53 and transferred to the audio signal generating circuit 6. However, since the mute instructing circuit 12 also outputs the signal "1" which is the mute instructing signal, the selector 21 is controlled to connect the "0" generating circuit 20 and the audio signal generating circuit 6.

As a result, instead of the coded audio data unpacked by the unpacking circuit 4, the data "0" generated by the "0" generating circuit 20 are sequentially stored in the data memory 10.

Here, since the current layer information (layer signal 30) indicates Layer I, the number of sample data per channel of the audio data included in the bit stream of one frame is 384. In this example, the data memory 10 has a 512-word capacity; therefore, the data memory 10 is cleared, or initialized, by storing data "0" generated by the "0" generating circuit 20 in a memory area of 384 words of the 512 words. Then, the audio signal generating circuit 6 reads the data "0" from the data memory 10 and outputs them as mute data from the output terminal OUT at the timing that the coded audio data of the "n"th frame would be outputted as the audio signal from the output terminal OUT.

In this way, instead of the coded audio data unpacked by the unpacking circuit 4, the data "0" generated by the "0" generating circuit 20 are sequentially stored in the data memory 10, and these data "0" are outputted as a muted audio signal from the output terminal OUT at the output timing of the audio signal corresponding to the "n"th frame.

During the decoding (muting) of the "n"th frame is being performed, the synchronous detecting circuit 2 performs synchronous detection on the next "n+1"th frame, and the synchronous state controlling circuit 31 generates the synchronous state of the "n+1"th frame.

Since the synchronous bits "1111111110" of the "n+1"th frame carries, the synchronous detecting circuit 2 again fails to detect synchronization. As a result of this detection failure, and in response to the Layer I information indicated by the layer signal 30 outputted from the header register 3 and the signal indicating the second locked state 2B as the current synchronous state (the state of the "n"th frame ), the synchronous state controlling circuit 31 outputs a signal which indicates that the state of the next "n+1"th frame is the third locked state 2C. In response to this signal, the synchronous state register 8 outputs the signal "1" from the output terminal T2C.

However, since the third locked state 2C also represents a locked state in which synchronization is still locked, the output signal of the unpacking instructing circuit 9 and the mute instructing circuit 12 both become "1", as in the case of its immediately preceding "n"th frame. The unpacking instructing circuit 9 thus outputs the signal "1" of the unpacking instructing signal; as a result, the inputted bit stream of the "n+1"th frame is unpacked by the unpacking circuit 4, and the coded audio data is extracted from the audio data field 53 and given to the audio signal generating circuit 6. However, since the mute instructing circuit 12 also outputs the signal "1" which is the mute instructing signal, the selector 21 is controlled to connect the "0" generating circuit 20 and the audio signal generating circuit 6.

As a result, as in the case of the "n "th frame, instead of the coded audio data unpacked by the unpacking circuit 4, the data "0" generated by the "0" generating circuit 20 are stored in the data memory 10. More specifically, "0" is started to store from the 385th word immediately following the "n"th frame, and when all accesses of the 384 samples of the "n+1"th frame have been completed, the 512-word area of the data memory 10 is fully zero-cleared. Then, the audio signal generating circuit 6 reads the data "0" from the data memory 10 and outputs them as mute data from the output terminal OUT at the timing that the coded audio data of the "n+1"th frame would be outputted as the audio signal from the output terminal OUT.

In the synchronous detection of the next "n+2"th frame, when the synchronous detecting circuit 2 detects the correct synchronous bits, the synchronous state of the "n+2"th frame returns to the first locked state 2a, but when it fails to detect synchronization, the state returns to the first unlocked state 1a.

Here, when the synchronous detection has failed, and when it is confirmed that the first unlocked state 1a has been established, the synchronous detecting circuit 2 immediately repeats the synchronous detection operation.

On the other hand, when synchronous detection failed of the "n"th frame and the layer signal 30 indicates Layer II, the synchronous state controlling circuit 31 outputs a signal indicating the third locked state 3C as the synchronous state of the "n"th frame, based on the synchronous detection result by the synchronous detecting circuit 2 and oil the signal currently held in the synchronous state register S which indicates the first locked state 2a of the synchronous state of the "n+1"th frame. For the "n"th frame in this case, the same operation is performed as for the "n+1"th frame in the third locked state 2C when the layer signal 30 indicates Layer I.

In this muting processing, not the coded audio data unpacked by the unpacking circuit 4 but the data "0" generated by the "0" generating circuit 20 are sequentially stored in the data memory 10.

Here, since the current layer information (layer signal 30) indicates Layer II, the number of sample data per channel of the audio data contained in the bit stream of one frame is 1152. In this example, the data memory 10 has a 512-word capacity; therefore, the data memory 10 is cleared, that is, when data "0" generated by the "0" generating circuit 20 are stored to fill its 512-word area during the processing of the "n"th frame data. Then, the audio signal generating circuit 6 reads the data "0" from the data memory 10 and outputs them as mute data from the output terminal OUT at the timing that the coded audio data of the "n"th frame would be outputted as the audio signal from the output terminal OUT.

In the synchronous detection of the succeeding "n+1"th frame, when the synchronous detecting circuit 2 detects the correct synchronous bits, the synchronous state of the "n+1"th frame returns to the first locked state 2a, but when it fails to detect synchronization, the state returns to the first unlocked state 1a.

Here, when the synchronous detection has failed, and when it is confirmed that the first unlocked state 1a has been established, the synchronous detecting circuit 2 immediately repeats the synchronous detection operation.

As described above, in the MPEG audio decoding circuit according to the second embodiment of the invention, when synchronous detection failed in a locked state, more specifically, when synchronous detection failed in the first locked state 2a or in the second locked state 2B, the synchronous state is controlled by judging whether the layer is Layer I or Layer II, and values being decoded by the audio signal generating circuit 6 are not stored into the data memory 10, but instead, the selector 21 stores the data "0" being generated by the "0" generating circuit 20 sequentially into the data memory 10, thus automatically accomplishing the initialization of the data memory 10. Accordingly, there is no need to initialize the data memory 10 each time the state returns to the first unlocked state 1a, and the synchronous detecting circuit 2 can immediately initiate the synchronous detection operation upon establishing the first unlocked state 1a.

Furthermore, when the data "0" are stored in the data memory 10 in the above manner, the data "0" are outputted as an audio signal at the timing that the audio signal in the frame corresponding to the data "0" would be outputted from the output terminal OUT, thus simultaneously accomplishing the muting processing.

Third Embodiment

Next, an MPEG audio decoding circuit according to a third embodiment of the invention will be described with reference to the block diagram of FIG. 8 showing one example of the configuration thereof.

In FIG. 8, reference numerals 1, 3 to 6, 8, 10 to 12, 20, 21, 30, and 31 designate the same component elements as those in the foregoing second embodiment. The third embodiment, however, is different from the second embodiment in that the synchronous detecting circuit indicated by reference numeral 2 in the foregoing embodiments is indicated by reference numeral 42 and comprises a synchronous judging circuit 41 and a synchronous bit detecting circuit 40. The synchronous bit detecting circuit 40 detects the synchronous bits, and the synchronous judging circuit 41 judges synchronization on the basis of the result from the synchronous bit detecting circuit 40 and the result from the CRC detecting circuit 5.

Further, the unpacking instructing circuit indicated by reference numeral 9 in the foregoing embodiments is indicated by reference numeral 43 in the third embodiment. The unpacking instructing circuit 43 is constructed from a two-input OR gate, to whose negative logic input terminal, the output signal of the output terminal T1a of the synchronous state register 8 from which the signal "1" is outputted when the first unlocked state 1a is detected, and to whose positive input terminal, an output signal of the synchronous bit detecting circuit 40, that is, a signal that turns to "1" when the synchronous bit detecting circuit 40 detects the synchronous bits. In this configuration, the unpacking instructing circuit 43 issues a signal "1" for instructing unpacking to the unpacking circuit 4 when the state is not the first unlocked state 1a or when the synchronous bit detecting circuit 40 has detected the synchronous bits.

The other component elements are the same as the corresponding elements in the second embodiment shown in FIG. 6, and therefore, explanation of such elements will not be repeated here.

The operation of the MPEG audio decoding circuit according to the third embodiment of the invention shown in FIG. 8 will be described next. The MPEG audio bit stream inputted via the input terminal IN is passed through the header extracting circuit 1, the unpacking circuit 4, and the audio signal generating circuit 6, and is temporarily stored in the data memory 10; then, the stored data is read out by the audio signal generating circuit 6 for decoding in the same manner as in the first and second embodiments, and the decoded data is again stored in the data memory 10 and then read out and outputted as an audio output signal from the output terminal OUT. The description hereinafter given focuses on the operation of synchronous detection.

Suppose here that a bit stream is inputted under the first unlocked state 1a. Then, the synchronous bit detecting circuit 40 checks the inputted bit stream by shifting bit by bit, and when the bit stream "111111111111" is detected, the header information of that frame, excluding the synchronous bits, is written to the header register 3. Next, in response to the output from the synchronous bit detecting circuit 40, the unpacking instructing circuit 43 instructs the unpacking circuit 4 to unpack the inputted bit stream. In the unpacking circuit 4, the CRC bits are unpacked from the bit stream, and in the CRC detecting circuit 5, CRC detection is performed using the unpacked CRC bits and the CRC target bits in the bit stream. The result is supplied to the synchronous judging circuit 41. When the result shows no CRC errors, the synchronous judging circuit 41 judges that synchronization has been established, and supplies the result, as the output of the synchronous detecting circuit 42, to the synchronous state controlling circuit 31. In accordance with the thus supplied result, the synchronous state controlling circuit 31 transits to the next state, that is, the second unlocked state 1b.

A series of subsequent operations, including state transition control and audio data decoding, are the same as those for the second embodiment.

On the other hand, after the synchronous bits are detected by the synchronous bit detecting circuit 40, when a bit error occurs in the CRC target bits in the bit stream and the condition is judged as being a CRC error during the CRC detection by the CRC detecting circuit 5, the synchronous judging circuit 41 judges that synchronization is not established, and supplies the result, as the output of the synchronous detecting circuit 42, to the synchronous state controlling circuit 31. In accordance with the thus supplied result, the synchronous state controlling circuit 31 maintains the first unlocked state 1a. Thereupon, the synchronous bit detecting circuit 40 performs synchronous bit detection.

As described above, in the MPEG audio decoding circuit according to the third embodiment of the invention, when the synchronous bits are detected in the first unlocked state 1a, and when no CRC errors are detected, then it is decided that synchronization is established from that frame. In this arrangement, therefore, when an CRC error is detected after detecting the synchronous bits, a synchronous bit detection operation can be immediately started.

As described in detail so far, according to the coded-signal decoding circuit of the invention, when a state signal indicating a transition from a synchronized state to an asynchronous state is outputted from synchronous state holding means, instead of an output from decoding means, data generated by initial data generating means are stored in storing means, thereby initializing the storing means. In this way, the initialization of the storing means can accomplished while the current frame is being decoded. This has the effect of reducing the time required to initialize the storing means when a transition is made to an asynchronous state.

Furthermore, according to the coded-signal decoding circuit of the invention and the synchronous control method for the same, when judging means has judged that a first kind of frame is currently being processed, and the synchronous state holding means has detected a third state or a fourth state, or when the judging means has judged that a second kind of frame is currently being processed, and the synchronous state holding means has detected a fourth state, instead of the output of the decoding means, data generated by the initial data generating means are stored in the storing means, thereby initializing the storing means. This offers the same effect as that provided the above-described coded-signal decoding circuit, regardless of whether the current frame is the first kind that includes a smaller number of samples per frame or the second kind that includes a larger number of samples per frame.

According to another coded-signal decoding circuit of the invention, provisions are made in the above-described coded-signal decoding circuit so that an operation will not be performed to detect whether the current state is a synchronized state or an asynchronous state, until after it is determined that no errors are contained in the inputted frame. This has the effect of avoiding unnecessary processing when an error is contained in the frame to be processed.

Further, according to the synchronous detecting circuit and the synchronous detection method for the same of the invention, only when the synchronous bits contained in the inputted bit stream have been detected and no errors have been detected in the inputted bit stream, it is decided that synchronization has been detected successfully. This has the effect of reducing the possibility of erroneous detection.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A coded-signal decoding circuit for processing a bit stream consisting of a plurality of successive frames each including sample data of a coded signal to be decoded, and synchronous information indicating a starting position of a frame as a unit of processing, comprising:

decoding means for decoding the sample data in each frame of said bit stream;

synchronous state holding means for holding information indicating a synchronized state or an asynchronous state, and a transition state therebetween, and for outputting a state signal indicating the state;

synchronous detecting means for detecting whether the state is the synchronized state or the asynchronous state on the basis of the synchronous information included in said inputted bit stream, and for outputting the detection result as a synchronous detecting signal;

synchronous state controlling means for judging the next synchronous state on the basis of the synchronous detecting signal outputted from said synchronous detecting means and the state signal outputted from said synchronous state holding means, and for making said synchronous state holding means hold the judgment result;

storing means, whose stored contents are initialized in the asynchronous state, for storing decoded signals obtained by said decoding means and for outputting the decoded signals at predetermined timing;

initial data generating means for generating data which makes the stored contents of said storing means be an initial state; and storing means initializing means for storing the data generated by said initial data generating means instead of an output of said decoding means, when said synchronous state holding means outputs the state signal indicating the transition state from the synchronized state to the asynchronous state.

2. The coded-signal decoding circuit as set forth in claim 1, which further comprises error judging means for judging the presence or absence of an error by extracting the error detection information from each frame in the bit stream, and wherein said frame includes error detection information for detecting an error in each frame, respectively, and said synchronous detecting means has: synchronous information detecting means for detecting the synchronous information included in said inputted bit stream; and synchronous judging means for judging whether the state is synchronized state or asynchronous state on the basis of the synchronous information detected by said synchronous information detecting means, only when said error judging means has judged that no errors are included.

3. A coded-signal decoding circuit for processing a bit stream consisting of a plurality of successive frames each including sample data of a coded signal to be decoded, and header information having synchronous information indicating a starting position of a frame as a unit of processing and information indicating the frame as a first kind of frame consisting of a relatively small number of sample data per frame or a second kind of frame consisting of a relatively large number of sample data per frame, comprising:

decoding means for decoding the sample data in each frame of said bit stream;

header information extracting means for extracting the header information from each frame in the bit stream;

synchronous state holding means for holding information indicating a synchronized state or an asynchronous state, and a transition state therebetween, and for outputting a state signal indicating the state;

synchronous detecting means for detecting whether the state is the synchronized state or the asynchronous state on the basis of the synchronous information included in the header information extracted by the header information extracting means, and for outputting the detection result as a synchronous detecting signal;

judging means for judging whether the frame is said first kind or said second kind on the basis of the header information extracted by said header information extracting means;

synchronous state controlling means for, based on the judgment result by said judging means, the synchronous detecting signal outputted from said synchronous detecting means, and the state signal outputted from said synchronous state holding means, judging at least whether the next state is a first state indicating an initial state or indicating that the synchronized state has not been detected, a second state indicating that the synchronized state has been detected, a third state indicating that the synchronized state has not been detected in the second state when the contents of said header information indicates the frame is said first kind of frame, or a fourth state indicating that the synchronized state has not been detected in the second state when the contents of said header information indicates the frame is said second kind of frame, and for making said synchronous state holding means hold the judgment result;

storing means, whose stored contents are initialized in the asynchronous state, and which has a storage capacity at least corresponding to the number of sample data of the second kind of frame, for storing decoded signals obtained by said decoding means and for outputting the decoded signals at predetermined timing;

initial data generating means for generating data which makes the stored contents of the storing means be an initial state; and storing means initializing means for storing the data generated by the initial data generating means instead of an output of said decoding means, when said judging means has judged that the frame currently being processed is said first kind, and said synchronous state holding means has detected said third state or said fourth state, or when said judging means has judged that the frame currently being processed is said second kind, and said synchronous state holding means has detected said fourth state.

4. The coded-signal decoding circuit as set forth in claim 3, which further comprises error judging means for judging the presence or absence of an error by extracting the error detection information from each frame in the bit stream, and wherein said frame includes error detection information for detecting an error in each frame, respectively, and said synchronous detecting means has: synchronous information detecting means for detecting the synchronous information included in said inputted bit stream; and synchronous judging means for judging whether the state is synchronized state or asynchronous state on the basis of the synchronous information detected by said synchronous information detecting means, only when said error judging means has judged that no errors are included.

5. A synchronous control method for a coded-signal decoding circuit for processing a bit stream consisting of a plurality of successive frames each including sample data of a coded signal to be decoded, and header information having synchronous information indicating a starting position of a frame as a unit of processing and information indicating the frame as a first kind of frame consisting of a relatively small number of sample data per frame or a second kind of frame consisting of a relatively large number of sample data per frame, comprising the steps of:

extracting the header information from each frame in said bit stream;

detecting whether the state is a synchronized state or an asynchronous state on the basis of the synchronous information included in the extracted header information;

judging whether the frame is said first kind or said second kind on the basis of the extracted header information; and performing synchronous control, based on the judgment result on the kind of frame, the synchronous detection result, and the current state, by judging at least whether the next state is a first state indicating an initial state or indicating that the synchronized state has not been detected, a second state indicating that the synchronized state has been detected, a third state indicating that the synchronized state has not been detected in said second state when the contents of said header information indicates the frame is said first kind, or a fourth state indicating that the synchronized state has not been detected in said second state when the contents of said header information indicates the frame is said second kind.

6. The synchronous control method for a coded-signal decoding circuit, as set forth in claim 5, wherein each frame includes error detection information for detecting an error in each frame, the synchronous information included in said inputted bit stream is detected, the presence or absence of an error is judged by extracting the error detection information from each frame in the bit stream, and synchronization has been detected, only when said synchronous information has been detected and the frame has been judged as including no errors.

* * * * *